United States Patent
Wu et al.

(10) Patent No.: US 11,224,045 B2
(45) Date of Patent: Jan. 11, 2022

(54) METHOD AND APPARATUS FOR VEHICLE TO EVERYTHING (V2X) COMMUNICATION IN A WIRELESS COMMUNICATION SYSTEM

(71) Applicant: Samsung Electronics Co., Ltd., Gyeonggi-do (KR)

(72) Inventors: Min Wu, Beijing (CN); Miao Zhou, Beijing (CN); Feifei Sun, Beijing (CN)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/932,037

(22) Filed: Jul. 17, 2020

(65) Prior Publication Data
US 2021/0022142 A1 Jan. 21, 2021

(30) Foreign Application Priority Data
Jul. 19, 2019 (CN) .......................... 201910657208.3

(51) Int. Cl.
*H04W 72/04* (2009.01)
*H04W 72/10* (2009.01)
*H04W 4/40* (2018.01)
*H04W 76/11* (2018.01)
(Continued)

(52) U.S. Cl.
CPC ....... *H04W 72/0493* (2013.01); *H04L 5/0098* (2013.01); *H04W 4/40* (2018.02); *H04W 72/042* (2013.01); *H04W 72/0466* (2013.01); *H04W 72/10* (2013.01); *H04W 76/11* (2018.02); *H04W 92/18* (2013.01)

(58) Field of Classification Search
CPC ... H04W 72/0493; H04W 72/10; H04W 4/40; H04W 76/11; H04W 72/0466; H04W 72/042; H04W 92/18; H04W 76/14; H04W 88/06; H04W 24/02; H04L 5/0098
See application file for complete search history.

(56) References Cited

U.S. PATENT DOCUMENTS

2016/0249250 A1\* 8/2016 Kim ...................... H04L 5/0073
2018/0279303 A1 9/2018 Sun et al.
(Continued)

OTHER PUBLICATIONS

Vivo, "Enhancements of NR Uu Link to Control LTE Sidelink", R1-1810393, 3GPP TSG RAN WG1 Meeting #94bis, Oct. 8-12, 2018, 3 pages.
(Continued)

*Primary Examiner* — Afshawn M Towfighi
(74) *Attorney, Agent, or Firm* — The Farrell Law Firm, P.C.

(57) ABSTRACT

A method for vehicle to everything (V2X) communication in a wireless communication system is provided. The method includes receiving, from a first network, first downlink control information (DCI) for scheduling of a sidelink associated with a second network, wherein the first network is associated with a new radio (NR) network and the second network is associated a long term evolution (LTE) network; and performing, based on the first DCI, a sidelink communication; wherein the first DCI is scrambled by a first radio network temporary identity (RNTI) different from a second RNTI scrambling a second DCI, wherein the second DCI is for scheduling of a sidelink associated with the first network, and wherein the first DCI is used to activate or deactivate a semi-persistently scheduled sidelink transmission.

14 Claims, 6 Drawing Sheets

(51) Int. Cl.
  *H04L 5/00*     (2006.01)
  *H04W 92/18*    (2009.01)

(56) References Cited

U.S. PATENT DOCUMENTS

2018/0338319 A1* 11/2018 Kim ..................... H04W 76/14
2019/0342910 A1* 11/2019 Cao ..................... H04L 5/0048
2019/0387501 A1* 12/2019 Park ..................... H04L 5/005
2021/0022091 A1* 1/2021 Li ..................... H04W 52/383

OTHER PUBLICATIONS

MediaTek Inc., "NR Sidelink Mode-1 Resource Allocation", R1-1906554, 3GPP TSG RAN1 WG1 Meeting #97, May 13-17, 2019, 7 pages.
Samsung, "On NR Uu Controlling LTE Sidelink", R1-1906943, 3GPP TSG RAN WG1 #97, May 13-17, 2019, 3 pages.
CMCC, "Discussion on Support of NR Uu Controlling LTE Sidelink", R1-1904731, 3GPP TSG RAN WG1 #96bis, Apr. 8-12, 2019, 5 pages.
International Search Report dated Oct. 26, 2020 issued in counterpart application No. PCT/KR2020/009483, 9 pages.
Huawei, HiSilicon, "NR Uu Control for LTE Sidelink", R1-1906593, 3GPP TSG RAN WG1 Meeting #97, May 13-17, 2019, 7 pages.
Ericsson, "Feature Lead Summary #4, on Resource Allocation for NR Sidelink Mode 1", R1-1907916, 3GPP TSG-RAN WGI Meeting #97, May 13-17, 2019, 29 pages.
European Search Report dated Dec. 9, 2021 issued in counterpart application No. 20843162.7-1215, 11 pages.

* cited by examiner

S1: Transmit information about LTE V2X
S2: Perform LTE V2X transmission according to the information transferred by the NR UU module S1: Transmit high layer configuration information about LTE V2X
S2: Receive transmission of LTE V2X according to the high layer configuration information transferred by the NR UU module S1: Transmit resource scheduling information of LTE V2X
S2: Perform transmission of LTE V2X according to the resource scheduling information transferred by the NR UU module
S3: Request resource scheduling of LTE V2X

METHOD AND APPARATUS FOR VEHICLE TO EVERYTHING (V2X) COMMUNICATION IN A WIRELESS COMMUNICATION SYSTEM

CROSS-REFERENCE TO RELATED APPLICATION(S)

This application is based on and claims priority under 35 U.S.C. § 119 to Chinese Patent Application No. 201910657208.3, filed on Jul. 19, 2019, in the Chinese Patent Office, the disclosure of which is incorporated by reference herein in its entirety.

BACKGROUND

1. Field

The application relates generally to the field of communication technologies, and in particular, to a method and apparatus for vehicle to everything (V2X) communication in a wireless communication system.

2. Description of Related Art

To meet the demand for wireless data traffic having increased since deployment of 4th generation (4G) communication systems, efforts have been made to develop an improved 5th generation (5G) or pre-5G communication system. The 5G or pre-5G communication system is also called a "beyond 4G network" or a "post long term evolution (LTE) system". The 5G communication system is considered to be implemented in higher frequency (millimeter (mm) wave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), and reception-end interference cancellation. In the 5G system, hybrid frequency shift keying (FSK), Feher's quadrature amplitude modulation (FQAM), sliding window superposition coding (SWSC) as an advanced coding modulation (ACM), filter bank multi carrier (FBMC), non-orthogonal multiple access (NOMA), and sparse code multiple access (SCMA) as an advanced access technology have been developed.

The Internet is now evolving to the Internet of things (IoT), where distributed entities, ("things") exchange and process information without human intervention. The Internet of everything (IoE), which is a combination of the IoT technology and the big data processing technology through connection with a cloud server, has emerged. As technology elements, such as sensing technology, wired/wireless communication and network infrastructure, service interface technology, and security technology have been demanded for IoT implementation, a sensor network, machine-to-machine (M2M) communication, and machine type communication (MTC), have been researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

Various attempts have been made to apply 5G communication systems to IoT networks. For example, technologies such as a sensor network, MTC, and M2M communication may be implemented by beamforming, MIMO, and array antennas. Application of a cloud RAN, as the above-described big data processing technology, may also be considered to be as an example of convergence between the 5G technology and the IoT technology.

Various services can be provided according to the development of a wireless communication system, and thus a method for easily providing such services is required.

SUMMARY

The present disclosure has been made to address the above-mentioned problems and disadvantages, and to provide at least the advantages described below.

According to an aspect of the disclosure, a method includes receiving, from a first network, first downlink control information (DCI) for scheduling of a sidelink associated with a second network, wherein the first network is associated with a new radio (NR) network and the second network is associated a long term evolution (LTE) network; and performing, based on the first DCI, a sidelink communication; wherein the first DCI is scrambled by a first radio network temporary identity (RNTI) different from a second RNTI scrambling a second DCI, wherein the second DCI is for scheduling of a sidelink associated with the first network, and wherein the first DCI is used to activate or deactivate a semi-persistently scheduled sidelink transmission.

According to another aspect of the disclosure, a user equipment (UE) in a wireless communication system includes a transceiver; and at least one processor connected with the transceiver and configured to receive, from a first network, first downlink control information (DCI) for scheduling of a sidelink associated with a second network, wherein the first network is associated with a new radio (NR) network and the second network is associated a long term evolution (LTE) network; and perform, based on the first DCI, a sidelink communication; wherein the first DCI is scrambled by a first radio network temporary identity (RNTI) different from a second RNTI scrambling a second DCI, wherein the second DCI is for scheduling of a sidelink associated with the first network, and wherein the first DCI is used to activate or deactivate a semi-persistently scheduled sidelink transmission.

According to another aspect of the disclosure, a method of operating a base station associated with a first network in a wireless communication system includes transmitting first downlink control information (DCI) for scheduling of a sidelink associated with a second network, wherein the first network is associated with a new radio (NR) network and the second network is associated a long term evolution (LTE) network, wherein a sidelink communication is performed based on the first DCI, wherein the first DCI is scrambled by a first radio network temporary identity (RNTI) different from a second RNTI scrambling a second DCI, wherein the second DCI is for scheduling of a sidelink associated with the first network, and wherein the first DCI is used to activate or deactivate a semi-persistently scheduled sidelink transmission.

According to another aspect of the disclosure, a base station associated with a first network in a wireless communication system includes a transceiver; and at least one processor connected with the transceiver and configured to transmit first downlink control information (DCI) for scheduling of a sidelink associated with a second network, wherein the first network is associated with a new radio (NR) network and the second network is associated a long term evolution (LTE) network, wherein a sidelink communication is performed based on the first DCI, wherein the first DCI is scrambled by a first radio network temporary identity (RNTI) different from a second RNTI scrambling a second DCI, wherein the second DCI is for scheduling of a sidelink associated with the first network, and wherein the first DCI is used to activate or deactivate a semi-persistently scheduled sidelink transmission.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
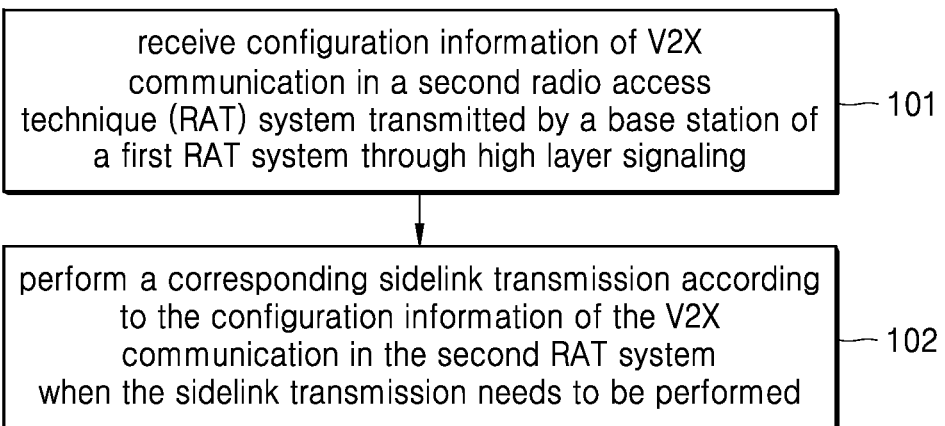
FIG. 1 shows a schematic flowchart of a V2X communication method, according to an embodiment.

Various embodiments of the present disclosure are described with reference to the accompanying drawings. However, various embodiments of the present disclosure are not limited to particular embodiments, and it should be understood that modifications, equivalents, and/or alternatives of the embodiments described herein can be variously made. With regard to description of drawings, similar components may be marked by similar reference numerals.

Those skilled in the art will understand that, unless specifically stated otherwise, the singular forms "a", "an" and "the" may include plural forms. It should be further understood that the terms "comprise" and "include" used in the description of the disclosure refers to the presence of the described feature, integer, step, operation, element, component and/or groups thereof, but does not exclude the presence or addition of one or more other features, integers, steps, operations, elements, components, and/or groups thereof. It should be understood that when an element is referred to as being "connected" or "coupled" to another element, it may be directly connected or coupled to the other element, or intermediate elements may also be present. Furthermore, "connected" or "coupled", as used herein, may include wirelessly connected or wirelessly coupled. The term "and/or" as used herein includes all or any of the elements and all combinations of one or more of the associated listed items.

Those skilled in the art may understand that, unless otherwise defined, all terms used herein, including technical and scientific terms, have the same meaning as those commonly understood by those of ordinary skill in the art to which this disclosure pertains. It should also be understood that such terms as those defined in a generally used dictionary should be understood to have the meanings consistent with the meanings in the context of the prior art, and would not be explained in idealized or overly formal meaning unless specifically defined like this herein.

Those skilled in the art may understand that "terminal" and "terminal equipment", as used herein, include both a wireless signal receiver device, which is a device only having wireless signal receiver without transmitting capability, and a receiving and transmitting hardware device, which is a device having receiving and transmitting hardware capable of performing bidirectional communication on a bidirectional communication link. Such a device may include a cellular or another communication device, which has a single-line display, a multi-line display or does not have a multi-line display; a personal communications service (PCS), which may combine voice and data processing, fax and/or data communication capabilities; a personal digital assistant (PDA), which may include a radio frequency receiver, a pager, internet/intranet access, a web browser, a notepad, a calendar, and/or a global positioning system (GPS) receiver; a conventional laptop and/or palmtop computer or other device which has and/or includes a radio frequency receiver. The "terminal" or "terminal equipment", as used herein, may be portable, transportable, installed in a vehicle (an air, sea, and/or land vehicle), or suitable and/or configured to operate locally, and/or operate in a distributed form on any other location on Earth and/or space. The "terminal" and "terminal equipment", as used herein, may also be a communication terminal, internet terminal, music/video playback terminal, such as a PDA, a mobile internet device (MID), and/or a mobile phone with a music/video playback function, and a smart TV, and a set-top box.

In a 3rd Generation Partnership Project (3GPP) long term evolution (LTE) V2X standard, two communication methods are defined: a centralized method (LTE-V-Cell) and a distributed method (LTE-V-Direct). The centralized method is also called a cellular method, which requires a base station as the control center; and the distributed method is also called a direct method, which does not require a base station as a support. That is, the centralized LTE V2X technique requires the deployment of LTE base stations to be used, and the distributed LTE V2X technique may be used without the deployment of an LTE base station.

Upon using 5G technologies, new radio (NR) base stations may be used to replace LTE base stations to provide support for an interface between user equipment and a network (UU port) communication. However, LTE V2X services may still have market space, and may not be completely replaced by NR V2X. Thus, there may be a terminal with both an NR UU module and an LTE V2X module, and the corresponding network deployment may have only an NR base station but no LTE base station. For the above type of terminal, if the centralized LTE V2X technique is still supported, then a solution is needed to implement control of LTE V2X communication.

In communication environments where different RAT systems alternate or coexist, it is very likely that V2X communications of different RAT systems need to exist. Considering mobile communication entering into a 5G era as an example, a 5G NR system base station (which may be referred to as an NR base station) is likely to gradually replace LTE base stations to provide supporting for UU interface communication, however, LTE V2X communication is likely to be needed at least in the short term and may not be completely replaced by NR V2X. A terminal (i.e., user equipment) that has both an NR UU interface module (which may be referred to as an NR UU module) and an LTE V2X communication module (which may be referred to as an LTE V2X module) may exist. For this type of terminal, if a centralized LTE V2X technique is still supported, the NR base station may be used as an LTE V2X control center, that is, the LTE V2X communication module is controlled via the NR UU interface. The NR base station transmits control signaling for the LTE V2X to the NR UU interface module of the terminal. The NR UU interface module of the terminal transfers the received control signaling to the LTE V2X communication module, and the LTE V2X communication module of the terminal then performs a corresponding sidelink transmission.

In order to support the function of controlling the LTE V2X by the NR UU, a standard on the NR UU side needs to be changed correspondingly, and the main changes are at the physical layer. Detailed design solutions may be provided to control a V2X communication of a second RAT system (such as an LTE system) via a UU interface of a first RAT system (such as an NR system).

An embodiment of the application provides a V2X communication method. In a wireless communication system, a UE communicates with a base station via a UU interface (an interface between the UE and the base station). The solution provided in the embodiment of the application is applicable to a UE with both a UU interface module of a first RAT system and a V2X communication module of a second RAT system. The UU interface module may perform information exchange with the V2X communication module of the second RAT system. The UU interface module of the first RAT system implements control of the V2X communication module of the two RAT system. That is, sidelink transmission of the V2X communication of the second RAT system may be controlled by the base station of the first RAT system via the UU interface module of the first RAT system in the UE. The base station of the first RAT system transmits relevant information of the V2X communication in the second RAT system to the UU interface of the first RAT system of the UE via the UU interface of the base station, and the V2X communication module performs information exchange with the base station of the first RAT system via the UU interface module.

In addition, it is clear to those skilled in the art that the UU interface module is a module in the UE for implementing communication between the UE and the base station, and the V2X communication module of the second RAT system is used for implementing V2X communication function in the second RAT system, i.e. for performing the sidelink transmission of the second RAT system, including sidelink transmission and/or sidelink reception.

Further, it may be understood that, in addition to the above-mentioned UU interface module and the V2X communication module of the second RAT system, the UE may include other functional modules, such as V2X communication module of the first RAT system, and various modules for implementing other communication functions of the first RAT system, such as functional modules that implement uplink transmission and/or downlink transmission, which are also clear to those skilled in the art, and will not be described in detail here.

The first RAT system may be an NR system, i.e., a 5G communication system, a base station of the system may be referred to as an NR base station, and the second RAT system may be an LTE system.

For the convenience of description, the V2X communication module of the second RAT system is referred to as a second V2X communication module in the subsequent description, and the V2X communication module of the first RAT system in the subsequent description is referred to as a first V2X communication module.

FIG. 1 shows a schematic flowchart of a V2X communication method, according to an embodiment. The V2X communication method may be specifically performed by a UE.

Referring to Step 101 of FIG. 1, the UE receives configuration information of V2X communication in a second RAT system transmitted by a base station of a first RAT system through higher layer signaling, to perform corresponding sidelink transmission according to the configuration information of the V2X communication in the second RAT system.

The higher layer signaling includes terminal equipment radio resource control (UE_specific RRC) signaling and/or a pre-defined dedicated cell system information block (SIB).

That is, part or all of the above configuration information transmitted by the base station may be transmitted through the UE_specific RRC signaling, or may be transmitted through the cell system information block of the first RAT system (that is, a new SIB specifically used for information indication of the V2X communication of the second RAT system may be defined in the first RAT system). Further, part of the above configuration information may be transmitted through the UE_specific RRC signaling and another part may be transmitted through the SIB. In addition, in actual practice, when transmitting through the SIB, this SIB may not be transmitted periodically, and may only be transmitted when requested by a UE with corresponding capabilities to save signaling overhead. When the sidelink transmission is reception of sidelink data, the base station may transmit the corresponding configuration information to the UE through the SIB according to actual needs.

The sidelink transmission may be transmission of sidelink data or reception of the sidelink data. For the reception of sidelink data, the configuration information shall at least include configuration information of a receiving resource pool.

Referring to step 102 of FIG. 1, the UE performs a corresponding sidelink transmission according to the configuration information of the V2X communication in the second RAT system when the sidelink transmission needs to be performed, i.e. when the UE by the base station of the first RAT system is achieved. That is, the base station may transmit relevant information (which includes the above configuration information, and may further include sidelink resource scheduling information) of the V2X communication function about the second RAT system to the second V2X communication module of the UE via the UU interface of the first RAT system of the UE, so that the V2X module may perform the corresponding sidelink transmission according to the received information. Therefore, even when only the NR base station is deployed (and no LTE base station is deployed), the second V2X communication module of the UE may work normally.

Figure 2:
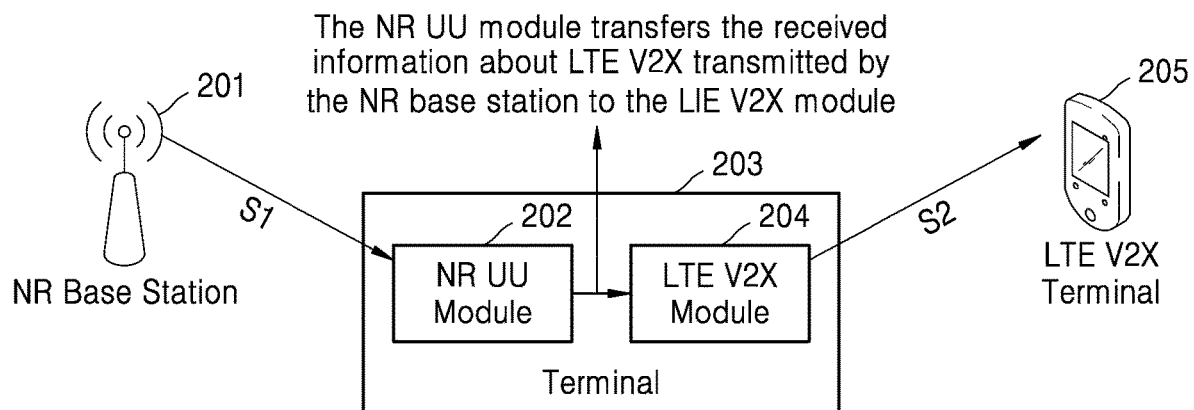
FIG. 2 shows a schematic flowchart of a V2X communication method, according to an embodiment.

FIG. 2 shows a schematic flowchart of a V2X communication method, according to an embodiment. The sidelink transmission in this example is data transmission, the first RAT system is an NR system, the base station in the system is an NR base station 201, and the second RAT system is an LTE system. The NR UU module 202 shown in FIG. 2 is the UU interface module of the NR system of the UE (the terminal 203 shown in FIG. 2), and the LTE V2X module 204 is the V2X communication module of the LTE system of the UE.

The terminal shown in FIG. 2 includes both the NR UU module and the LTE V2X module. The terminal may receive higher layer configuration information about LTE V2X (corresponding to information about LTE V2X) transmitted by the NR base station through higher layer signaling, via the NR UU module of the terminal. The NR UU module transfers the received higher layer configuration information to the LTE V2X module.

When the terminal needs to perform V2X communication of the LTE system, in particular, in this example, when performing LTE V2X sidelink transmission, the LTE V2X module may perform the corresponding sidelink transmission according to the higher layer configuration information (perform the LTE V2X transmission according to the information transferred by the NR UU module as shown in FIG. 2). As shown in FIG. 2, the LTE V2X module of the terminal performs the LTE sidelink transmission with another user equipment (LTE V2X terminal 205) according to the higher layer configuration information. Specifically, in this example, the LTE V2X module (i.e., the V2X communication module) of the terminal may perform Mode 4 sidelink transmission of the LTE system according to the configuration information about the LTE V2X transferred by the NR UU module (i.e., the UU interface module).

In the Mode 4 sidelink transmission of the LTE V2X, sidelink resources used by the UE are autonomously selected by the UE, that is, distributed (LTE-V-Direct) communication, which is also referred to as direct communication. LTE-V-Direct communication does not require a base station as support. However, the higher layer configuration information required for Mode 4 transmission of the LTE V2X may be obtained through the base station, and may also be obtained through pre-configured parameters (which are hard coded into a chip, for example) of the V2X device. In the example provided by the embodiment of the application, the high layer configuration information required for the Mode 4 transmission of the LTE V2X is obtained through the NR base station.

Figure 3:
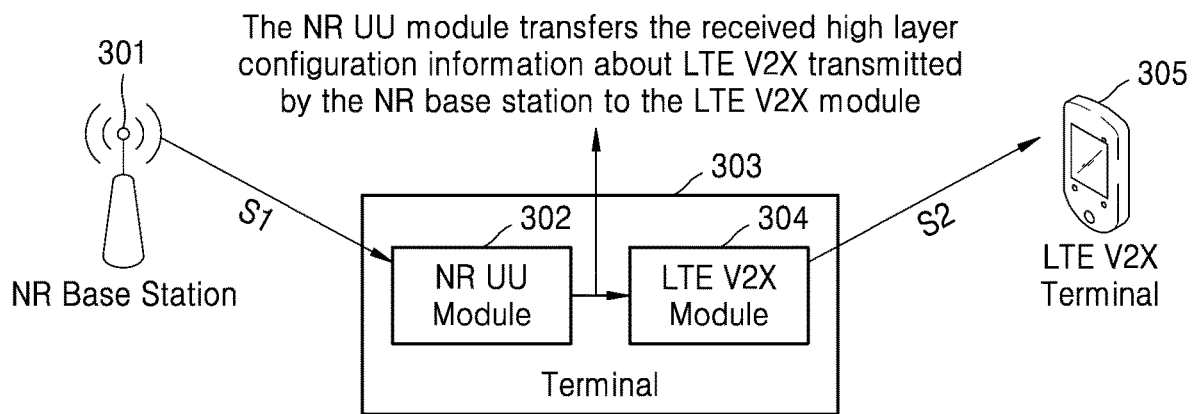
FIG. 3 shows a schematic flowchart of a V2X communication method, according to an embodiment.

FIG. 3 shows a schematic flowchart of a V2X communication method, according to an embodiment. The sidelink transmission in this example is sidelink reception. The terminal 303 in this example may refer to the description of the terminal 203 in the above example, and is not repeated here. In this example, the NR UU module 302 of the terminal receives the higher layer configuration information about the LTE V2X transmitted by the NR base station 301 through higher layer signaling, and transfers the received higher layer configuration information to the LTE V2X module 304.

The LTE V2X module of the terminal receives the LTE V2X transmission according to the higher layer configuration information about the LTE V2X transferred by the NR UU module, that is, receives data transmitted by another user equipment. When the sidelink transmission is reception, the higher layer configuration information about the LTE V2X at least includes configuration information of a receiving resource pool.

It should be noted that the other user equipment in the above examples (i.e., the LTE V2X terminal 205 shown in FIG. 2 and the LTE V2X terminal 305 shown in FIG. 3) is a terminal having an LTE V2X communication module, which may be a terminal of the LTE system, that is, the UU interface module of the user equipment may be a UU interface module of the LTE system. The V2X communication module of the user equipment may be a V2X communication module of the LTE system, or may be a terminal having both a UU interface module of the NR system and a V2X communication module of the LTE system. That is, the other user equipment and the user equipment performing the method provided by the embodiment of the application may be same type of terminals or different types of terminals, as long as the other user equipment has the LTE V2X communication module.

Performing the corresponding sidelink transmission according to the configuration information of the V2X communication in the second RAT system may include receiving DCI for indicating sidelink resource scheduling information of the V2X communication in the second RAT system transmitted by the base station, and performing the corresponding sidelink transmission according to the configuration information of the V2X communication in the second RAT system and the sidelink resource scheduling information.

Specifically, the UU interface module of the first RAT system of the UE receives the sidelink resource scheduling information of the V2X communication in the second RAT system transmitted by the base station of the first RAT system through the DCI and the UU interface module transfers the received sidelink resource scheduling information to the second V2X communication module of the UE, so that when sidelink transmission is needed, the V2X communication module performs the corresponding sidelink transmission according to the higher layer configuration information and the sidelink resource scheduling information. Specifically, the V2X communication module may perform transmission of sidelink data according to the higher layer configuration information and the sidelink resource scheduling information transmitted by the base station.

Referring to FIG. 2, the terminal 203 has both an NR UU module 202 and an LTE V2X module 204.

The information about the LTE V2X received by the terminal through NR UU module thereof may include higher layer configuration information and sidelink resource scheduling information. Specifically, the NR UU module of the terminal receives the configuration information about the V2X communication of the LTE system transmitted by the NR base station through higher layer signaling, and receives the sidelink resource scheduling information about the LTE V2X transmitted by the NR base station through the DCI, and transfers the received higher layer configuration information and sidelink resource scheduling information to the LTE V2X module, so that the LTE V2X module performs Mode 3 sidelink transmission of the LTE system according to the higher layer configuration information and the sidelink resource scheduling information. In the Mode 3 sidelink transmission of the LTE V2X, sidelink resources used by the UE are uniformly allocated by the base station to perform centralized communication, which is also referred to as cellular communication, requiring the base station to act as a control center. In the solution provided by the embodiment of the application, the NR base station is the control center of the LTE V2X communication. That is, sidelink resources used by the Mode 3 sidelink transmission of the LTE V2X are uniformly allocated by the NR base station.

Based on the solution provided by the embodiment of the application, the V2X communication function of the second RAT system by the base station of the first RAT system is achieved. That is, the UU interface module of the first RAT system of the UE receives relevant information (the above-mentioned high layer configuration information and/or sidelink resource scheduling information) of the V2X communication in the second RAT system transmitted by the base station, and the UU interface module transfers the relevant information received from the base station to the V2X communication module of the second RAT system of the UE, so that the V2X communication module may perform the corresponding sidelink transmission according to the relevant information.

Receiving the DCI of the V2X communication in the second RAT system transmitted by the base station may include transmitting a resource scheduling request for the V2X communication in the second RAT system to the base station through at least one of RRC signaling, dedicated scheduling request (SR) signaling, and dedicated buffer status report (BSR) signaling; and receiving the DCI transmitted by the base station according to the resource SR.

After receiving the resource SR for the V2X communication in the second RAT system transmitted by the UE, the base station of the first RAT system may transmit the sidelink resource scheduling information of the V2X communication in the second RAT system to the UE through the DCI, based on the resource SR.

Figure 4:
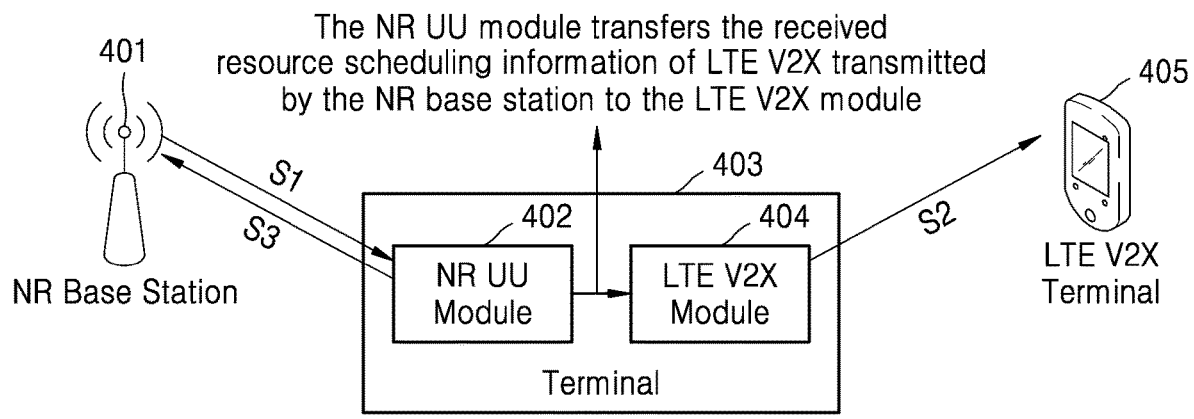
FIG. 4 shows a schematic flowchart of a V2X communication method, according to an embodiment.

FIG. 4 shows a schematic flowchart of a V2X communication method, according to an embodiment. In this example, the first RAT system is an NR system, the base station is an NR base station 401, the second RAT system is an LTE system, and the V2X communication of the second RAT system is LTE V2X.

As shown in FIG. 4, for Mode 3 transmission of the LTE V2X, when data services arrive, the LTE V2X module 404 (the second V2X communication module in this example) of the UE shall transfer, to the NR UU module 402 (the UU interface module in this example) of the UE, resource request signaling and/or the size of data block to be transmitted. The NR UU module 402 and the LTE V2X module 404 are included in the terminal 403.

The NR UU module requests resource scheduling of the LTE V2X from the NR base station, that is, transmits a resource scheduling request about the LTE V2X to the base station. After receiving the resource scheduling request for the LTE V2X, the NR base station transmits sidelink resource scheduling information about the LTE V2X to the NR UU module of the UE based on the request. The NR UU module transfers the received sidelink resource scheduling information about the LTE V2X to the LTE V2X module. Then, the LTE V2X module of the UE may perform corresponding LTE V2X transmission to the LTE V2X terminal 405 according to the sidelink resource scheduling information transferred by the NR UU module.

The NR UU module of the UE may request LTE V2X resource scheduling from the NR base station through RRC signaling. Here, the LTE V2X module shall transfer the resource request information to the NR UU module, and the NR UU module transmits the corresponding resource scheduling request to the NR base station.

The NR UU module of the UE may also request LTE V2X resource scheduling from the NR base station through SR signaling. That is, in addition to the SR used to request UL resource scheduling, the NR system may newly define an SR specifically used to request LTE V2X resource scheduling. The NR base station may specially configure periodic physical uplink control channel (PUCCH) resources for the SR requesting LTE V2X resources. That is, the NR base station configures corresponding PUCCH resources for the SR requesting LTE V2X resources and the SR requesting UL resources, respectively. Similarly, here, the LTE V2X module shall transfer the resource request information to the NR UU module, and the NR UU module transmits the corresponding resource scheduling request to the NR base station.

The NR UU module of the UE may also request the NR V2X resource scheduling from the NR base station by reporting data size of the LTE V2X to be transmitted. Specifically, the UE may transmit BSR of the LTE V2X module to the NR base station. That is, in addition to reporting the BSR of the NR UU module to the NR base station, the UE reports BSR of the LTE V2X module, and the NR system may newly define a BSR specifically used for the LTE V2X module. Similarly, the LTE V2X module shall transfer information about buffered data size to the NR UU module, and the NR UU module reports the data size that the LTE V2X module needs to transmit to the NR base station, and the NR base station transmits the sidelink resource scheduling information about the LTE V2X to the NR UU module after receiving this information, and the NR UU module transfers the received sidelink resource scheduling information to the LTE V2X module.

A UE having both a UU interface module of a first RAT system and a V2X communication module supporting V2X communication function of a second RAT system may be used to perform the method of FIGS. 2-4. The V2X communication module supporting the V2X communication function of the second RAT system communicates with the base station via the UU interface module of the first RAT system, and the UU interface module and the V2X communication module of the UE may perform information exchange.

Specifically, the UE transmits relevant information of the V2X communication in the second RAT system received from the base station of the second RAT system to the V2X communication module via the UU interface module, and transmits information to be transmitted to the base station by the V2X communication module to the base station via the UU interface module. The V2X communication module is used to perform sidelink transmission related to the V2X communication of the second RAT system.

The V2X communication method may further include transmitting capability information for informing the UE's communication capability to the base station, where the capability information includes information that the UE has the capability to support information exchange between the UU interface module and the V2X communication module, or the capability information includes information that the UE has the capability to support the information exchange between the UU interface module and the V2X communication module, and information about processing time of the information exchange between the UU interface module and the V2X communication module.

If the UE receives indication information of an additional time interval between reception of the DCI transmitted by the base station for the V2X communication in the second RAT system and the corresponding sidelink transmission, the additional time interval shall be greater than or equal to the processing time of the information exchange between the UU interface module and the V2X communication module reported by the UE.

Since the method for controlling the V2X communication module of the second RAT system via the UU interface module of the first RAT system provided in the embodiments of the application is only applicable to UE with specific capability, the system may newly define a UE that supports this capability. Such a capability requires that the UE has both the UU interface module of the first RAT system and the V2X communication module of the second RAT system, and has information exchange capability between the two modules. This type of UE may report to the base station of the first RAT system whether it supports this capability. In this way, the base station of the second RAT system may know which UEs in the system may support such a capability.

As an example, when the first RAT system is an NR system and the second RAT system is an LTE system, The UE supporting the above capability is the UE supporting the capability of NR UU controlling LTE V2X, where the UE has both the NR UU module and the LTE V2X module, and has an information exchange capability between the NR UU module and the LTE V2X module, and the UE shall report to the base station whether it has the capability to support the control over the LTE V2X by the NR UU.

The configuration information of the V2X communication in the second RAT system may include at least one of indication information about transmission bandwidth of the V2X communication of the second RAT system newly introduced in the first RAT system, indication information about uplink and downlink sub-frame configuration of the second RAT system newly introduced in the first RAT system, V2X configuration information in an existing second RAT system reused in the first RAT system, indication information, which is newly introduced in the first RAT system, for indicating a control resource element set (CORESET) and/or a search space where DCI of sidelink resource scheduling information of the V2X communication in the second RAT system is located, and indication information, which is newly introduced in the first RAT system, for indicating an additional time interval between reception of the DCI for indicating the sidelink resource scheduling information of the V2X communication in the second RAT system and the corresponding sidelink transmission.

The above newly introduced additional time interval is to reserve the processing time of information exchange between the UU interface module of the first RAT system and the V2X communication module of the second RAT system of the UE. The additional time interval shall be greater than or equal to the processing time of information exchange between the UU interface module of the first RAT system and the V2X communication module of the second RAT system of the UE, to ensure that the V2X communication module of the UE performs corresponding sidelink transmission according to the received information after obtaining the sidelink resource scheduling information related to the V2X communication of the second RAT system transferred by the UU interface module.

Optionally, a value of the additional time interval is fixed, and all UEs use the same value of the time interval. That is, the system defines only one value, and the processing time of the information exchange between the UU interface module of the first RAT system and the V2X communication module of the second RAT system of all UEs shall be less than or equal to the value.

Optionally, the value of the additional time interval is fixed, and different UEs may use different values of time interval. That is, the system defines a plurality of values, and different UEs correspond to different values according to implementation capabilities. Each of the UEs report a corresponding value to the base station, and the base station always performs V2X resource scheduling of the second RAT system based on the value of the time interval reported by the UEs.

Optionally, the value of the additional time interval is configurable, and is indicated by explicit signaling. The base station of the first RAT system may configure different values of the additional time interval for different UEs. For example, the base station may configure the value of the additional time interval for the UE through UE_specific RRC signaling. The base station may configure a corresponding value of the additional time interval for the UE according to the capability reported by the UE. For example, the UE reports relevant capability of the processing time of information exchange between the UU interface module of the first RAT system and the V2X communication module of the second RAT system to the base station, and the base station configures the value of the additional time interval according to the reported capability.

For a UE supporting capability of controlling the LTE V2X via the NR UU, the UE may further need to report the processing time of the information exchange between the NR UU module and the LTE V2X module. The base station configures a value of the additional time interval according to the reported value of the processing time of the information exchange. The processing time of the information exchange between the NR UU module and the LTE V2X module of the UE may not be greater than the value of the additional time interval configured by the base station.

The first RAT system may be an NR system and the second RAT system may be an LTE system to further describe the foregoing configuration information. At this time, the configuration information is higher layer configuration information of LTE V2X.

Higher layer configuration information of the LTE V2X will now be described.

Specifically, in this embodiment, the configuration information about the LTE V2X transmitted by the NR base station and received by the NR UU module of the terminal may include at least one of the following types of information (1-6):

1. Transmission Bandwidth of the LTE V2X.

This parameter is only used for a case where the LTE V2X shares a carrier frequency with the NR UU. If the LTE V2X does not share a carrier frequency with the NR UU, this parameter does not need to be additionally configured. The NR base station may indicate corresponding transmission bandwidth while configuring an operating carrier frequency of the LTE V2X.

In the existing LTE system, when the LTE V2X shares a carrier frequency with the LTE UU, the UE uses uplink system bandwidth indicated in system information block type 2 (SIB2) of the LTE as the transmission bandwidth of the LTE V2X. In the NR system, when the LTE V2X shares a carrier frequency with the NR UU, most of the uplink system bandwidth indicated in cell system information of the NR is larger than the maximum system bandwidth (20 megahertz (MHz)) of the LTE system, so it cannot be used as the transmission bandwidth of the LTE V2X. An uplink carrier bandwidth part (BWP) configured to the UE shall not be used as the transmission bandwidth of the LTE V2X either. The NR base station needs to additionally indicate the transmission bandwidth of the LTE V2X, including indicating a starting position and bandwidth size within the NR uplink system bandwidth.

2. Uplink and Downlink Sub-Frame Configuration of Time Division Duplexing (TDD) LTE System.

In the existing LTE TDD system, seven types of uplink and downlink sub-frame configurations are supported. The actual used uplink and downlink sub-frame configuration is indicated in cell system information block system information block type 1 (SIB1). The UE determines a position of uplink sub-frame according to configuration information of the uplink and downlink sub-frame, and determines a position of a sub-frame that may be actually used for the LTE V2X transmission by combining it with the configuration information of resource pool. In the existing NR system, a position of uplink and downlink sub-frame may be flexibly and dynamically configured. Transmission direction of the flexible sub-frame is dynamically indicated by DCI. In order to maintain backward compatibility of the LTE V2X, the NR base station shall additionally indicate one of the seven types of the uplink and downlink sub-frame configurations for the LTE V2X communication, and the NR base station shall ensure that the indicated uplink sub-frame in the uplink and downlink sub-frame configuration is always used for uplink transmission.

3. Configuration Information about the LTE V2X Indicated by System Information Block Type 21 (SIB21) in the Existing LTE System.

Configuration information of a common receiving resource pool may include configuration information of a common transmitting resource pool, configuration information of a synchronization source, and an information list of adjacent frequency.

4. Configuration Information about the LTE V2X Indicated by UE Specific RRC Signaling in the Existing LTE System.

Configuration information of a UE-specific receiving resource pool may include configuration information of a UE-specific transmitting resource pool, and configuration information of a sidelink radio network temporary identity (RNTI) value.

The above information 3 (configuration information about the LTE V2X indicated by SIB21) and information 4 (configuration information about the LTE V2X indicated by UE specific RRC signaling in the existing LTE system) are configuration information about the V2X in the existing second RAT system (LTE system in this embodiment). In the first RAT system (NR system in this embodiment), the configuration information about the V2X in the existing second RAT system may be reused.

5. Configuration Information for Monitoring DCI for Indicating the Sidelink Resource Scheduling of the LTE V2X.

Configuration information of CORESET where the DCI is located, and/or configuration information of search space that monitors the DCI.

6. Configuration Information of Timing Offset (i.e., Additional Time Interval) Between Reception of the DCI for Indicating the Sidelink Resource Information of the LTE V2X Transmitted by the NR UU Module of the UE to the NR Base Station and Transmission of the LTE V2X Module of the UE Performing the Corresponding Sidelink Transmission.

The timing offset may be an additional timing offset. In practice, the actual timing offset (total timing offset) between the above reception of the DCI and the corresponding sidelink transmission is mainly composed of two parts. One part is the existing timing offset in the LTE system, which is indicated by the DCI, and mainly corresponds to the changing position of the uplink sub-frame of the TDD system. The other part is an additional timing offset introduced for controlling the LTE V2X by the NR base station, which may be indicated by UE-specific RRC signaling, and mainly corresponds to the information exchange between the NR UU module and the LTE V2X module of the UE. The value of this additional timing offset shall not be less than the processing time of the information exchange between the NR UU module and the LTE V2X module of the UE.

Among the above configuration information, information 1 (transmission bandwidth of the LTE V2X), information 2 (uplink and downlink sub-frame configuration of time division duplexing (TDD) LTE system), information 5 (configuration information for monitoring DCI for indicating the sidelink resource scheduling of the LTE V2X) and information 6 (configuration information of timing offset (i.e., additional time interval) between reception of the DCI for indicating the sidelink resource information of the LTE V2X transmitted by the NR UU module of the UE to the NR base station and transmission of the LTE V2X module of the UE performing the corresponding sidelink transmission) are newly introduced for controlling the LTE V2X by the NR UU, and information 3 (configuration information about the LTE V2X indicated by SIB 21) and information 4 (configuration information about the LTE V2X indicated by UE specific RRC signaling in the existing LTE system) may directly reuse relevant parameter configuration of the LTE system.

Optionally, all the above-mentioned configuration information about the LTE V2X may be transmitted through UE specific RRC signaling. For example, after the UE reports to the NR base station that the UE has the capability of controlling the LTE V2X by the NR UU, that is, the UE has both an NR UU module and an LTE V2X module, and information exchange may be performed between the NR UU module and the LTE V2X module. The NR base station may then transmit all configuration information about the LTE V2X to the NR UU module of the UE through the UE specific RRC signaling.

Optionally, part of the above-mentioned configuration information about the LTE V2X may be transmitted through cell system information of the NR, such as the above-mentioned information 1 (transmission bandwidth of the LTE V2X), information 2 (uplink and downlink sub-frame configuration of time division duplexing (TDD) LTE system) and information 3 (configuration information about the LTE V2X indicated by SIB21). In the NR system, a new SIB may be defined specifically for information indication of the LTE V2X. This SIB may be transmitted only after being requested by a UE with corresponding capability, rather than be transmitted periodically, to save signaling overhead. The other part of the above-mentioned configuration information about the LTE V2X may be transmitted through the UE specific RRC signaling, such as the above-mentioned information 4 (configuration information about the LTE V2X indicated by UE specific RRC signaling in the existing LTE system), information 5 (configuration information for monitoring DCI for indicating the sidelink resource scheduling of the LTE V2X), and information 6 (configuration information of timing offset (i.e., additional time interval) between reception of the DCI for indicating the sidelink resource information of the LTE V2X transmitted by the NR UU module of the UE to the NR base station and transmission of the LTE V2X module of the UE performing the corresponding sidelink transmission).

The UE may receive indication information of an additional time interval between reception time of the DCI of the V2X communication in the second RAT system transmitted by the base station and transmission time of performing the corresponding sidelink transmission. This additional time interval may be configured based on the capability information reported by the UE. The capability information reported by the UE may further include the processing time of the information exchange between the UU interface module and the V2X communication module, so that the additional time interval configured by the base station is greater than or equal to the processing time of the information exchange between the UU interface module and the V2X communication module reported by the UE.

A value of the above-mentioned additional time interval may be determined by the UE by the UE using a value of the processing time of the information exchange between the UU interface module and the V2X communication module thereof reported to the base station by the UE as the value of the above-mentioned additional time interval; the UE using a value of the additional time interval pre-configured through UE-specific RRC signaling as the value of the above-mentioned additional time interval; and the UE using a value of the additional time interval dynamically indicated by the DCI for indicating the sidelink resource scheduling information of the V2X communication in the second RAT system as the value of the above-mentioned additional time interval.

Performing the corresponding sidelink transmission according to the configuration information of the V2X communication in the second RAT system by the UE may include performing the corresponding sidelink transmission on a first available sub-frame for the V2X communication of the second RAT system which is not earlier than the following time:

$$T_{DL} - \frac{N_{TA}}{2} \times T_S + (4+m) \times 10^{-3} + X$$

where, $T_{DL}$ represents a start time of a downlink sub-frame in which the received DCI for indicating the sidelink resource scheduling information of the V2X communication in the second RAT system is located, $N_{TA}$ represents a timing offset of an uplink radio frame of a UE relative to a downlink radio frame, $T_S$ represents a duration time of one sample, m represents a time interval between reception of the DCI for indicating the sidelink resource scheduling information about the V2X communication and the corresponding sidelink transmission in the existing second RAT system, and X represents an additional time interval. The value of m is 0 without being indicated for the frequency division duplex (FDD) system, and the value of m is 0, 1, 2, or 3 being indicated by the DCI for the time division duplex (TDD) system, and the additional time interval represents a newly introduced additional time interval between reception of the DCI for indicating the sidelink resource scheduling information of the V2X communication in the second RAT system and the corresponding sidelink transmission.

The above-mentioned DCI for indicating the sidelink resource scheduling information of the V2X communication in the second RAT system may include DCI for indicating dynamic scheduling of sidelink resources, and/or, DCI for indicating activating or deactivating semi-persistent scheduling (SPS) of the sidelink transmission.

That is, the above-mentioned DCI transmitted by the base station of the first system and received by the UU interface module (such as NR UU module of the terminal) of the first RAT system of the UE may dynamically indicate the sidelink resources, and may further activate/deactivate the SPS of the sidelink transmission. The deactivation may also be a release.

The above-mentioned indication information for activating or deactivating the SPS of the sidelink transmission may include at least one of relevant indication information for activating or deactivating the SPS of sidelink transmission in an existing second RAT system; relevant indication information of a PUCCH that feeds back acknowledgement (ACK) of the DCI for indicating activating or deactivating the SPS of the sidelink transmission; indication information for indicating the sidelink transmission of the second RAT system on an uplink carrier or a supplementary uplink carrier; indication information for indicating an additional time interval between reception of the DCI for indicating the sidelink resource scheduling information of the V2X communication in the second RAT system and the corresponding sidelink transmission; and indication information for indicating a total time interval between reception of the DCI of the sidelink resource scheduling information of the V2X communication in the second RAT system and the corresponding sidelink transmission, wherein the total time interval includes the above additional time interval and a time interval between reception of the DCI for indicating the sidelink resource scheduling information about the V2X communication and the corresponding sidelink transmission in the existing second RAT system.

The following still takes the first RAT system being an NR system and the second RAT system being an LTE system as an example to further describe the foregoing indication information as contents of DCI about the LTE V2X transmitted by the NR base station.

Specifically, when the DCI transmitted by the NR base station is used to activate/deactivate SPS of the sidelink transmission, it shall include at least one of the following twelve indication fields (1-12):

1. Carrier indicator, which generally has 3 bits, and is used to indicate a carrier frequency used by sidelink transmission of the LTE V2X. The NR base station may configure up to 8 carrier frequencies of the LTE V2X through higher layer signaling.
2. Indicator of the lowest index of the sub-channel allocation to sidelink initial transmission, which generally has $\lceil \log_2(N_{subchannel}^{SL}) \rceil$ bits, where $N_{subchannel}^{SL}$ represents a number of allocated sub-channels, and is used to indicate the lowest index of the sub-channel allocated for the initial transmission of the LTE V2X. The sub-channel is the minimum granularity allocated by PSSCH. The UE may be allocated one or more continuous sidelink sub-channels.
3. Indicator of frequency domain resource location of the sidelink initial transmission and the sidelink retransmission, which generally has $\lceil \log_2 (N_{subchannel}^{SL} (N_{subchannel}^{SL}+1)/2) \rceil$ bits, and is used to indicate the frequency domain resource location of the initial transmission and retransmission of the LTE V2X. When there is no retransmission, it only indicates frequency domain resource location of the initial transmission of the LTE V2X.
4. Indicator of time interval between the sidelink initial transmission and the sidelink retransmission, which generally has 4 bits, and is used to indicate the time interval between the initial transmission and retransmission of the LTE V2X. The unit of the indicator is sub-frame (i.e. 1 millisecond (ms)). When the indicator value of the time interval is zero, it means that there is no retransmission of the LTE V2X.
5. Indicator of sidelink index, which generally has 2 bits, and is used to indicate timing offset between reception of DCI and the sidelink transmission. This timing offset is the above-mentioned time interval between the reception of the DCI for indicating the sidelink resource scheduling information about the V2X communication and the corresponding sidelink transmission in the existing second RAT system.

As shown in the following table, the indicator of the sidelink index has 2 bits, and indicator values are "00", "01", "10", and "00", respectively. Indicator values of corresponding timing offset (m) are in the range of 0 to 3. This indicator fields are only for a TDD system. For an FDD system, this indicator fields do not exist, and the value of m is 0.

| Indicator value of sidelink index | Value of m |
|---|---|
| 00 | 0 |
| 01 | 1 |
| 10 | 2 |
| 11 | 3 |

6. Indicator of index of sidelink an SPS configuration, which generally has 3 bits, and is used to indicate the index of the SPS configuration activated by the LTE V2X sidelink transmission. The NR base station may configure up to 8 SPS transmissions for the LTE V2X, and the UE determines the corresponding transmission period according to the index of the SL SPS configuration.

7. Indicator of activation/deactivation, which generally has 1 bit, and is used to indicate the activation or deactivation of the SPS transmission of the LTE V2X. When the DCI indicates activation, the UE may initiate periodic transmission on the sidelink resources determined by the above indicator fields 1-5. The value of the period is determined by the indicator field 6. When the DCI indicates deactivation, the UE shall stop transmission on the sidelink resources determined by the indicator fields 1-5.

8. Indicator of uplink carrier/supplementary uplink carrier, which generally has 1 bit, and is used to indicate whether resource scheduling of the LTE V2X uses resources of the uplink carrier or resources of the supplementary uplink (SUL) carrier.

9. Indicator of PUCCH resource, which generally has 3 bits, and is used to indicate the PUCCH resource used for ACK feedback of the sidelink SPS activation or release.

10. Indicator of time interval between hybrid automatic repeat request (HARQ) feedback and the associated PDCCH, which has 3 bits, and is used to indicate the time interval between transmission time of the PUCCH carrying the ACK of the sidelink SPS activation or release and reception time of the corresponding PDCCH that indicates the sidelink SPS activation or release.

11. Indicator of transmit power control (TPC) for the scheduled PUCCH, which is used to indicate adjustment of transmit power of the scheduled PUCCH. Here, the scheduled PUCCH refers to the PUCCH carrying the ACK of the sidelink SPS activation or release.

12. Indicator of timing offset between reception of the DCI indicating sidelink resource information of the LTE V2X at the NR UU module of the UE transmitted from the NR base station and transmission of the corresponding sidelink transmitted by the LTE V2X module of the UE.

The actual timing offset between the reception of the DCI and the transmission of the corresponding sidelink may be composed of two parts. One part is the existing timing offset in the LTE system, which may be indicated by the above indicator field 5, and is mainly for the changeable uplink sub-frame pattern in the TDD system. The other part is the additional timing offset introduced for controlling the LTE V2X by the NR base station, which is mainly for information exchange between the NR UU module and the LTE V2X module of the UE.

The indicator fields 12 may indicate the above-mentioned additional timing offset, i.e., the additional time interval. The value of this additional timing offset should not be less than the processing time of the information exchange between the NR UU module and the LTE V2X module of the UE. When the NR base station dynamically indicates the additional timing offset between reception of the DCI of the sidelink resource information of the LTE V2X and the corresponding sidelink transmission through the DCI, more flexible sidelink resource scheduling can be supported.

The value the additional time interval indicated by the above indicator field 12 is an integer, and the unit of the additional time interval is microsecond, and accordingly, the LTE V2X module of the UE shall perform the corresponding sidelink transmission on a first available LTE V2X sub-frame which is not before the time of $$T_{DL} - \frac{N_{TA}}{2} \times T_S + (4 + m) \times 10^{-3} + X \times 10^{-6}.$$

The value of the additional time interval (corresponding to X), which may be indicated by the above indicator field 12, is an integer, and the unit of the additional time interval is microsecond. Accordingly, the LTE V2X module of the UE shall perform the corresponding sidelink transmission on a first available LTE V2X sub-frame which is not before the time of $$T_{DL} - \frac{N_{TA}}{2} \times T_S + (4 + m + X) \times 10^{-3},$$

where m is the value indicated by the above indicator field 5 and is a value of 0 to 3. If it is an FDD system, the value of m is 0.

The timing offset indicated by the indicator field 12 here may be a total time interval, that is, the timing offset indicated by the indicator field 12 is the existing timing offset of the LTE system and the additional timing offset introduced for controlling the LTE V2X by the NR base station. The above indicator field 5 may not need to be included.

Accordingly, the LTE V2X module of the UE performs the corresponding sidelink transmission on a first available LTE V2X sub-frame which is not before the time of $$T_{DL} - \frac{N_{TA}}{2} \times T_S + (4 + X_{total}) \times 10^{-3}.$$

$X_{total}$ is the total time interval and its unit is millisecond. When the NR base station dynamically indicates the total timing offset between reception of the DCI of the sidelink resource information of the LTE V2X and the corresponding sidelink transmission through the DCI, the advantage is that more flexible sidelink resource scheduling may be supported.

For the above indicator fields, the information indicated by indicator fields 1 to 7 is relevant indication information for activating or deactivating SPS of the sidelink transmission in the existing LTE system. The indicator fields 1-7 may fully reuse existing indicator fields of DCI format 5A of the LTE system. The indicator field 8 may reuse existing indicator fields of the DCI of scheduling PUSCH of the NR system. The indicator fields 9 to 11 may reuse existing indicator fields of the DCI of scheduling physical downlink shared channel (PDSCH) of the NR system. The indicator field 12 is a newly introduced indicator field. When the DCI transmitted by the NR base station is used to activate or release the SL SPS, the UE shall feedback an ACK to the NR base station to confirm that the activation or release of the SL SPS has taken effect. Optionally, the UE may only perform ACK feedback on the release of the SL SPS, and does not need to perform ACK feedback on the activation of the SL SPS, since loss of SL SPS activation signaling has a smaller impact on the system than loss of SL SPS release signaling. Optionally, the UE may perform ACK feedback on both the release and activation of the SL SPS.

When the DCI transmitted by the NR base station is used to dynamically indicate a sidelink resource for LTE V2X, it does not need to include the above indicator fields 6-7 and 9-11.

At least one of the DCI for indicating sidelink resource scheduling information of V2X communication in the second RAT system, the DCI for indicating sidelink resource scheduling information of V2X communication in the first RAT system in a same cell, and the DCI for scheduling PUSCH in the first RAT system of the same cell meets at least one of the following conditions (1-2):

1. Both the DCI for indicating sidelink resource scheduling information of V2X communication in the second RAT system, and the DCI for indicating sidelink resource scheduling information of V2X communication in the first RAT system use the same RNTI to scramble a cyclic redundancy check CRC or use a different RNTI to scramble the CRC, wherein, if using the same RNTI to scramble the CRC, both of the two DCIs carry identification information to distinguish one from the other.
2. The DCI for indicating the dynamic scheduling of the sidelink resource of the V2X communication in the second RAT system and the DCI for indicating activating or deactivating the SPS of the sidelink transmission use the same RNTI to scramble the CRC or use a different RNTI to scramble the CRC, wherein, if the DCI for indicating the dynamic scheduling of the sidelink resource and the DCI for indicating activating or deactivating the SPS of the sidelink transmission use the same RNTI to scramble the CRC, both of the two DCIs carry identification information to distinguish one from the other.

If payload size of the DCI for indicating the sidelink resource scheduling information of the V2X communication in the second RAT system is not equal to payload size of DCI format 0_0 and/or DCI format 0_1 for scheduling PUSCH in the same cell, a zero bit is appended to the DCI for indicating the sidelink resource scheduling information of the V2X communication in the second RAT system until the padded payload size is equal to the payload size of the DCI format 0_0 and/or the DCI format 0_1 for scheduling PUSCH in the same cell.

The DCI for indicating the sidelink resource scheduling information of the V2X communication in the second RAT system may be configured in a same search space as the DCI format 0_0 and/or the DCI format 0_1 for scheduling PUSCH.

The DCI for indicating the sidelink resource scheduling information of the V2X communication in the second RAT system may be configured in a same search space as the DCI format 0_0 and/or the DCI format 0_1 for scheduling PUSCH, and the total number of DCIs with different payload sizes may be monitored by a UE for the same search space greater than a first set value.

The DCI for indicating the sidelink resource scheduling information of the V2X communication in the second RAT system may not be configured in a same search space as the DCI format 0_0 and/or the DCI format 0_1 for scheduling PUSCH, and the total number of DCIs with different payload sizes may be monitored by a UE for all search spaces of the cell greater than a second set value.

If payload size of the DCI for indicating the sidelink resource scheduling information of the V2X communication in the second RAT system is not equal to a payload size of DCI for indicating the sidelink resource scheduling information of V2X communication in the first RAT system in the same cell, a zero bit is appended to one DCI with a smaller payload size between the DCI for indicating the sidelink resource scheduling information of the V2X communication in the second RAT system and the DCI for indicating the sidelink resource scheduling information of the V2X communication in the first RAT system in the same cell until the padded payload size is equal to the payload size of the other DCI.

The DCI for indicating the sidelink resource scheduling information of the V2X communication in the second RAT system may be configured in a same search space as the DCI for indicating the sidelink resource scheduling information of the V2X communication in the first RAT system.

The DCI for indicating the sidelink resource scheduling information of the V2X communication in the second RAT system may be configured in a same search space as the DCI for indicating the sidelink resource scheduling information of the V2X communication in the first RAT system, and the total number of DCIs with different payload sizes monitored by a UE for the same search space may be greater than a third set value;

The DCI for indicating the sidelink resource scheduling information of the V2X communication in the second RAT system may not be configured in a same search space as the DCI for indicating the sidelink resource scheduling information of the V2X communication in the first RAT system, and the total number of DCIs with different payload sizes monitored by a UE for all search spaces in the cell may be greater than a fourth set value.

The DCI for indicating the sidelink resource scheduling information of the V2X communication in the second RAT system may not be configured in a same search space as the DCI format 0_0 and/or the DCI format 0_1 for scheduling PUSCH, and the DCI for indicating the sidelink resource scheduling information of the V2X communication in the second RAT system may be configured in a same search space as the DCI for indicating the sidelink resource scheduling information of the V2X communication in the first RAT system.

The DCI for indicating the sidelink resource scheduling information of the V2X communication in the second RAT system may not be configured in the same search space as the DCI format 0_0 and/or the DCI format 0_1 for scheduling PUSCH, the DCI for indicating the sidelink resource scheduling information of the V2X communication in the second RAT system may be configured in the same search space as the DCI for indicating the sidelink resource scheduling information of the V2X communication in the first RAT system, and the total number of DCIs with different payload sizes monitored by a UE for the same search space may be greater than a fifth set value.

The DCI for indicating the sidelink resource scheduling information of the V2X communication in the second RAT system may not be configured in the same search space as the DCI format 0_0 and/or the DCI format 0_1 for scheduling PUSCH, the DCI for indicating the sidelink resource scheduling information of the V2X communication in the second RAT system may not be configured in the same search space as the DCI for indicating the sidelink resource scheduling information of the V2X communication in the first RAT system, and the total number of DCIs with different payload sizes monitored by a UE for all search spaces in the cell may be greater than a sixth set value.

Accordingly, payload alignment of different DCIs may be achieved to reduce the amount of blind decoding for DCIs of the UE.

Load alignment of DCIs is described below.

The first RAT system may be an NR system and the second RAT system may be an LTE system.

In addition to controlling sidelink resource scheduling of Mode 3 of the LTE V2X through DCI, the NR base station may control sidelink resource scheduling of Mode 1 of the NR V2X (V2X communication of the first RAT system) through DCI. Mode 1 of the NR V2X is similar to Mode 3 of the LTE V2X, and both of them allocate sidelink resources through the base station, that is, a centralized communication node.

Optionally, the DCI controlling the sidelink resource scheduling of Mode 1 of the NR V2X and the DCI controlling the sidelink resource scheduling of Mode 3 of the LTE V2X use different RNTI to scramble the CRC. For example, the former uses a newly defined SL-V-RNTI to scramble, and the latter uses a newly defined LTE-SL-V-RNTI to scramble.

Optionally, the DCI controlling the sidelink resource scheduling of Mode 1 of the NR V2X and the DCI controlling the sidelink resource scheduling of Mode 3 of the LTE V2X use same RNTI to scramble. For example, both of them use a newly defined SL-V-RNTI to scramble the CRC, and the two DCIs are distinguished by a 1-bit dedicated indicator fields within the DCI.

Optionally, the above DCI for indicating the LTE V2X transmitted by the NR base station may be used only to indicate the activation/deactivation of the SPS of the LTE V2X, and is not used to indicate the dynamic scheduling of the sidelink resource.

Optionally, the above DCI for indicating the LTE V2X transmitted by the NR base station may be used to indicate the dynamic scheduling of the sidelink resource in addition to being used to indicate the activation/deactivation of the SPS of the LTE V2X. The DCI for indicating the activation/deactivation of the SPS of the LTE V2X and the DCI dynamically indicating the sidelink resource scheduling may be monitored on the same search space by default, and payload size may be aligned. Optionally, the two DCIs may be distinguished by a 1-bit dedicated indicator fields. Additionally or alternatively, two DCIs may be distinguished by using different RNTIs. For example, the DCI for indicating the activation/deactivation of the SPS of the LTE V2X uses a newly defined LTE-SL-V-RNTI to scramble the CRC, while the DCI for indicating the dynamic scheduling of the sidelink resource uses another newly defined LTE-SL-SPS-V-RNTI to scramble the CRC.

Optionally, when the DCI for indicating the LTE V2X transmitted by the NR base station (for example, the DCI for indicating the dynamic sidelink resource scheduling of the LTE V2X, or the DCI for indicating the activation/deactivation of the SPS of the LTE V2X), is configured in a same search space as DCI format 0_0 and/or DCI format 0_1 for scheduling PUSCH in a same cell, if an information bit of the DCI for indicating the LTE V2X is less than a payload size of the DCI format 0_0 and/or the DCI format 0_1, bit 0 shall be appended to the DCI for indicating the LTE V2X until the payload size of the DCI format 00 and/or the DCI format 0_1 is the same. That is, the payload size of the DCI for indicating the LTE V2X shall be aligned with that of the DCI format 0_0 and/or the DCI format 0_1 for scheduling the PUSCH, so as to not increase blind decoding for DCIs of the UE.

Optionally, when the above-mentioned DCI for indicating the LTE V2X transmitted by the NR base station (for example, the DCI for indicating the dynamic resource scheduling of the LTE V2X, or the DCI for indicating the activation/deactivation of the SPS of the LTE V2X), is configured in a same search space as the DCI format 0_0 and/or the DCI format 0_1 for scheduling PUSCH in a same cell, if the total number of DCIs with different payload sizes monitored by the UE for this search space is greater than 4 (a first set value), bit 0 shall be appended to the DCI for indicating the LTE V2X until it is the same payload size of the DCI format 0_0 and/or the DCI format 0_1; if the total number of DCIs with different payload sizes monitored by the UE for this cell is not greater than 4, there is no need to bit-fill the DCI for indicating the LTE V2X. In practice, when the total number of DCIs with different payload sizes monitored by the UE for this cell is less than or equal to 4, the DCI for indicating the LTE V2X may also be padded.

When the above-mentioned DCI for indicating the LTE V2X transmitted by the NR base station (for example, the DCI for indicating the dynamic resource scheduling of the LTE V2X, or the DCI for indicating the activation/deactivation of the SPS of the LTE V2X), is not configured in the same search space as the DCI format 0_0 and/or the DCI format 0_1 for scheduling PUSCH in the same cell, if the total number of DCIs with different payload sizes monitored by the UE for all search space in the cell is greater than 4 (a second set value), bit 0 shall be appended to the DCI for indicating the LTE V2X, until it is the same payload size as the DCI format 0_0 and/or the DCI format 0_1; if the total number of DCIs with different payload sizes monitored by the UE for all search space in the cell is not greater than 4, there is no need to bit-fill the DCI for indicating the LTE V2X. In practice, when the above total number is less than or equal to 4, the DCI for indicating the LTE V2X may also be padded.

Optionally, when the above-mentioned DCI for indicating the LTE V2X transmitted by the NR base station, is not configured in a same search space as the DCI format 0_0 or the DCI format 0_1 for scheduling PUSCH in the same cell, and is configured in the same search space as the DCI for indicating the NR V2X (for example, the DCI for indicating the dynamic resource scheduling of the NR V2X, or the DCI for indicating the activation/deactivation of the SPS of the NR V2X), if an information bit of the DCI for indicating the LTE V2X is less than a payload size of the DCI for indicating the NR V2X, bit 0 shall be appended to the DCI for indicating the LTE V2X until it is the same payload size of the DCI for indicating the NR V2X; if the information bit of the DCI for indicating the NR V2X is less than a payload size of the DCI for indicating the LTE V2X, bit 0 shall be appended to the DCI for indicating the NR V2X until it is the payload size of the DCI for indicating the LTE V2X. That is, the payload size of the DCI for indicating the LTE V2X shall be aligned with that of the DCI for indicating the NR V2X, so as to not increase the amount of blind decoding for DCIs of the UE.

Optionally, when the above-mentioned DCI for indicating the LTE V2X transmitted by the NR base station is not configured in the same search space as the DCI format 0_0 or the DCI format 0_1 for scheduling PUSCH in the same cell, and is configured in the same search space as the DCI for indicating the NR V2X (for example, the DCI for indicating the dynamic resource scheduling of the NR V2X, or the DCI for indicating the activation/deactivation of the SPS of the NR V2X), if an information bit of the DCI for indicating the LTE V2X is less than a payload size of the DCI for indicating the NR V2X, and the total number of DCIs with different payload sizes monitored by the UE for this search space (the same search space in which the DCI for indicating the LTE V2X and the DCI for indicating the NR V2X are configured) is greater than 4 (a fifth set value), bit 0 shall be appended to the DCI for indicating the LTE V2X until it is the same as the payload size of the DCI for indicating the NR V2X. Alternatively, if information bit of the DCI for indicating the NR V2X is less than payload size of the DCI for indicating the LTE V2X, and the total number of DCIs with different payload sizes monitored by the UE for all search space in this cell is greater than 4 (a sixth set value), bit 0 shall be appended to the DCI for indicating the NR V2X until it is the same as the payload size of the DCI for indicating the LTE V2X. If the total number of DCIs with different payload sizes monitored by the UE for this search space is not greater than 4, there is no need to bit-fill the DCI for indicating the LTE V2X or the DCI for indicating the NR V2X. In practice, when the above total number is less than or equal to 4, the DCI for indicating the LTE V2X or the DCI for indicating the NR V2X may also be padded.

Optionally, when the above-mentioned DCI for indicating the LTE V2X transmitted by the NR base station is not configured in a same search space as the DCI format 0_0 or the DCI format 0_1 for scheduling PUSCH in the same cell, and is not configured in the same search space as the DCI for indicating the NR V2X either, if an information bit of the DCI for indicating the dynamic resource scheduling of the LTE V2X is less than a payload size of the DCI for indicating the activation/deactivation of the SPS of the LTE V2X, bit 0 shall be appended to the DCI for indicating the dynamic resource scheduling of the LTE V2X until it is the same as the payload size of the DCI for indicating the activation/deactivation of the SPS of the LTE V2X. That is, the payload size of the DCI for indicating the dynamic resource scheduling of the LTE V2X shall be aligned with that of the DCI for indicating the activation/deactivation of the SPS of the LTE V2X, so as to achieve the purpose of not increasing the amount of blind decoding for DCIs of the UE.

Optionally, when the above-mentioned DCI for indicating the LTE V2X transmitted by the NR base station is not configured in a same search space as the DCI format 0_0 or the DCI format 0_1 for scheduling PUSCH in a same cell, and is not configured in a same search space as the DCI for indicating the NR V2X either, if an information bit of the DCI for indicating the dynamic resource scheduling of the LTE V2X is less than a payload size of the DCI for indicating the activation/deactivation of the SPS of the LTE V2X, and if total number of DCIs with different payload sizes monitored by the UE for this cell (all search space in this cell) is greater than 4, bit 0 shall be appended to the DCI for indicating the dynamic resource scheduling of the LTE V2X until it is the same as the payload size of the DCI for indicating the activation/deactivation of the SPS of the LTE V2X. If the total number of DCIs with different payload sizes monitored by the UE for this cell is not greater than 4, there is no need to bit-fill the DCI for indicating the dynamic resource scheduling of the LTE V2X. In practice, when the total number is less than or equal to 4, the DCI for indicating the dynamic resource scheduling of the LTE V2X may also be padded.

In an embodiment of the application, CORESET and/or a search space in which the DCI for indicating the sidelink resource scheduling information of the V2X communication in the second RAT system is located, may meet at least one of the following conditions (1-4):

1. The DCI for indicating the sidelink resource scheduling information of the V2X communication in the second RAT system shares the same CORESET with the DCI for indicating the sidelink resource scheduling information of the V2X communication in the first RAT system in the same cell.
2. The DCI for indicating the sidelink resource scheduling information of the V2X communication in the second RAT system and/or the DCI for indicating the sidelink resource scheduling information of the V2X communication in the first RAT system in the same cell are configured with a dedicated CORESET.
3. The DCI for indicating the sidelink resource scheduling information of the V2X communication in the second RAT system shares the same search space with the DCI for indicating the sidelink resource scheduling information of the V2X communication in the first RAT system in the same cell.
4. The DCI for indicating the sidelink resource scheduling information of the V2X communication in the second RAT system and/or the DCI for indicating the sidelink resource scheduling information of the V2X communication in the first RAT system in the same cell are configured with a dedicated search space.

The first RAT system may be an NR system and the second RAT system may be an LTE system.

In practical, before monitoring the DCI for indicating the sidelink resource scheduling information about the LTE V2X communication transmitted by the NR base station, the UE needs to obtain necessary information for monitoring the DCI, such as CORESET configuration information and a search space where the DCI is located to monitor the DCI based on this information.

Optionally, the NR base station does not need to specifically configure CORESET for the DCI for indicating the sidelink resource scheduling information of the LTE V2X. That is, the DCI for indicating the sidelink resource scheduling of the LTE V2X may share the same CORESET with the DCI for indicating the resource scheduling information of the NR UU.

Optionally, the NR base station configures dedicated CORESET for the DCI for indicating the sidelink resource scheduling information of the LTE V2X and/or the DCI for indicating the sidelink resource scheduling information of the NR V2X. That is, the DCI for indicating the sidelink resource scheduling information of the LTE V2X and/or the DCI for indicating the sidelink resource scheduling information of the NR V2X do not share a same CORESET with the DCI for indicating the resource scheduling information of the NR UU.

Optionally, the NR base station does not need to specifically configure a search space for the DCI for indicating the sidelink resource scheduling information of the LTE V2X. That is, the DCI for indicating the sidelink resource scheduling of the LTE V2X shares a same search space with the DCI for indicating the resource scheduling information of the NR UU.

Optionally, the NR base station configures a dedicated search space for the DCI for indicating the sidelink resource scheduling information of the LTE V2X and/or the DCI for indicating the sidelink resource scheduling information of the NR V2X. That is, the DCI for indicating the sidelink resource scheduling information of the LTE V2X and/or the DCI for indicating the sidelink resource scheduling information of the NR V2X do not share the same search space with the DCI for indicating the resource scheduling information of the NR UU.

In an embodiment of the application, if uplink (UL) transmission of the first RAT system, sidelink transmission of the V2X communication of the first RAT system, and sidelink transmission of the V2X communication of the second RAT system overlap in time, the method meets at least one of the following conditions (1-5):
1. First handling overlap between the sidelink transmission of the V2X communication of the first RAT system and the sidelink transmission of the V2X communication of the second RAT system, and then handling overlap between the sidelink transmission of the V2X communication of the first RAT system or the sidelink transmission of the V2X communication of the second RAT system and the UL transmission according to the previous handling result, and performing the sidelink transmission and/or UL transmission according to the final handling result.
2. First handling overlap between the UL transmission and the sidelink transmission of the V2X communication of the first RAT system, and then handling overlap between the UL transmission or the sidelink transmission of the V2X communication of the first RAT system and the sidelink transmission of the V2X communication of the second RAT system according to the previous handling result, and performing the sidelink transmission and/or UL transmission according to the final handling result.
3. If two transmissions and one reception are included, first handling overlap between two transmissions, and then handling overlap between one transmission or another transmission among the two transmissions and the one reception according to the previous handling result, and performing the transmission and/or reception according to the final handling result.
4. If two receptions and one transmission are included, first handling overlap between two receptions, and then handling overlap between one reception or another reception among the two receptions and the one transmission according to the previous handling result, and performing the reception and/or transmission according to the final handling result.
5. If three transmissions are included, determining a transmission type of the three transmissions according to a first indication value indicated by a priority field in sidelink control information (SCI) of the sidelink transmission of the V2X communication of the first RAT system and a second indication value indicated by a priority field in SCI of the sidelink transmission of the V2X communication of the second RAT system.

Determining the transmission type of the three transmissions according to the first indication value and the second indication value comprises any one of the following events (1-8):
1. If there is an indication value less than a pre-configured threshold value in the first indication value and the second indication value, and the first indication value is not equal to the second indication value, performing sidelink transmission with the smaller indication value between the first indication value and the second indication value, and dropping sidelink transmission with the larger indication value and the UL transmission.
2. If there is an indication value less than a pre-configured threshold value in the first indication value and the second indication value, and the first indication value is equal to the second indication value, the UE automatically performing one of the sidelink transmission of the V2X communication of the first RAT system or the sidelink transmission of the V2X communication of the second RAT system, dropping the other one and the UL transmission or, according to a pre-configured or pre-defined rule, always performing one of the sidelink transmission of the V2X communication of the first RAT system or the sidelink transmission of the V2X communication of the second RAT system, and dropping the other one that is not performed and the UL transmission.
3. If there is no indication value less than a pre-configured threshold value in the first indication value and the second indication value, performing the UL transmission, and dropping the sidelink transmission of the V2X communication of the first RAT system and the sidelink transmission of the V2X communication of the second RAT system.
4. If there is an indication value less than a pre-configured threshold value in the first indication value and the second indication value, and the first indication value is not equal to the second indication value, if the larger indication value is greater than or equal to the pre-configured threshold value, preferentially adjusting sidelink transmission power with the larger indication value, and further adjusting UL transmission power.
5. If the larger indication value is smaller than the pre-configured threshold value, preferentially adjusting UL transmission power transmission, and further adjusting sidelink power transmission with the larger indication value, and controlling transmission according to the adjustment results, wherein the adjusted total power transmitted in an overlapping area is less than or equal to the maximum power transmission of the UE.
6. If there is an indication value less than a pre-configured threshold in the first indication value and the second indication value, and the first indication value is equal to the second indication value, preferentially adjusting UL power transmission, and further automatically adjusting one of sidelink transmission power of the V2X communication of the first RAT system or the sidelink transmission of the V2X communication of the second RAT system, or according to a pre-configured or pre-defined rule, always adjusting one of sidelink power transmission of the V2X communication of the first RAT system or the sidelink transmission of the V2X communication of the second RAT system, and controlling transmission according to the adjustment results, wherein, the adjusted total power transmitted in an overlapping area is less than or equal to the maximum power transmission of the UE.
7. If there is no indication value less than a pre-configured threshold value in the first indication value and the second indication value, and the first indication value is not equal to the second indication value, preferentially adjusting sidelink power transmission with the larger indication value, and further adjusting sidelink power transmission with the smaller indication value, and controlling transmission according to the adjustment results, wherein the adjusted total power transmission in an overlapping area is less than or equal to the maximum power transmission of the UE.
8. If there is no indication value less than a pre-configured threshold value in the first indication value and the second indication value, and the first indication value is equal to the second indication value, the UE automatically adjusting sidelink power transmission of the V2X communication of the first RAT system and/or sidelink power transmission of the V2X communication of the second RAT system, or according to a pre-configured or pre-defined rule, always adjusting sidelink power transmission of the V2X communication of the first RAT system and/or transmit the sidelink power transmission of the V2X communication of the second RAT system, and controlling transmission according to the adjustment results, wherein the adjusted total transmitted power in an overlapping area is less than or equal to the maximum power transmitted of the UE.

The sidelink transmission of the V2X communication of the first RAT system and the sidelink transmission of the V2X communication of the second RAT system correspond to the same pre-configured threshold value or to different pre-configured threshold values. If the sidelink transmission of the V2X communication of the first RAT system and the sidelink transmission of the V2X communication of the second RAT system correspond to different pre-configured threshold values, whether the first indication value is less than the pre-configured threshold value refers to whether the first indication value is less than a pre-configured threshold value corresponding to the sidelink transmission of the V2X communication of the first RAT system, and whether the second indication value is less than the pre-configured threshold value refers to whether the second indication value is less than a pre-configured threshold value corresponding to the sidelink transmission of the V2X communication of the second RAT system.

In an embodiment of the application, if the UL transmission of the first RAT system overlaps with sidelink transmission in time, and the sidelink transmission is the sidelink transmission of the V2X communication of the first RAT system or the sidelink transmission of the V2X communication of the second RAT system, the UL transmission and the sidelink transmission meet any one of the following conditions (1-9):
1. If the sidelink transmission is reception of a sidelink channel, performing the UL transmission and dropping the sidelink transmission.
2. If the sidelink transmission is transmission of a sidelink channel, obtaining a third indication value indicated by the priority field of SCI of the sidelink transmission, and comparing the third indication value to a pre-configured threshold value (e.g. a pre-configured first threshold value).
3. If the third indication value is less than the pre-configured first threshold value, dropping the UL transmission and performing the sidelink transmission.
4. If the third indication value is greater than or equal to the pre-configured first threshold value, dropping the sidelink transmission and performing the UL transmission.
5. If the sidelink transmission is transmission of a sidelink channel, obtaining a fourth indication value indicated by the priority field of the SCI of the sidelink transmission, and comparing the fourth indication value to a pre-configured threshold value (e.g. a pre-configured second threshold value).
6. If the fourth indication value is less than the pre-configured second threshold value, adjusting UL power transmission.
7. If the fourth indication value is greater than or equal to the pre-configured second threshold value, adjusting sidelink power transmission, wherein the adjusted total UL power transmitted and the sidelink transmission in an overlapping area is less than or equal to the maximum power transmitted from the UE.
8. If the sidelink transmission is transmission of a sidelink channel, and the UE does not obtain an indication value indicated by the "priority" field of the SCI of the sidelink transmission before a preparation time of performing the transmission of the sidelink transmission, the UE automatically drops the UL transmission or the sidelink transmission, or automatically adjusts the UL transmission power or the sidelink transmission power, wherein the adjusted total UL transmission power and the sidelink transmission in an overlapping area is less than or equal to the maximum power transmitted from the UE.
9. If the sidelink transmission is transmission of a sidelink channel, and the UE does not obtain an indication value indicated by the priority field of the SCI of the sidelink transmission before a preparation time of performing the transmission of the sidelink transmission, the UE compares a default value of a pre-configured indication value to a pre-configured threshold value, drops the UL transmission or the sidelink transmission based on the comparison result, or adjusts the UL power transmission or the sidelink power transmission, wherein the adjusted total UL transmission power and the sidelink transmission in an overlapping area is less than or equal to the maximum transmit power of the UE.

In an embodiment of the application, if the sidelink transmission of the V2X communication of the first RAT system temporally overlaps with the sidelink transmission of the V2X communication of the second RAT system, the sidelink transmission of the V2X communication of the first RAT system and the sidelink transmission of the V2X communication of the second RAT system meet any one of the following conditions (1-6):
1. If the two sidelink transmissions are both transmissions of sidelink channels, before a preparation time of performing the transmission of the sidelink transmission, according to a fifth indication value indicated by the priority field of the SCI of the sidelink transmission of the V2X communication of the first RAT system and a sixth indication value indicated by the priority field of the SCI of the sidelink transmission of the V2X communication of the second RAT system, the UE drops the sidelink transmission with the larger indication value, or preferentially adjusts sidelink transmission power with the larger indication value, to meet that the adjusted total sidelink transmission power of the V2X communication of the first RAT system and the sidelink transmission of the V2X communication of the second RAT system in the overlapping area, which is less than or equal to the maximum transmission power from the UE.

2. If the fifth indication value is equal to the sixth indication value, or the fifth indication value and/or the sixth indication value is not obtained before a preparation time of performing the transmission of the sidelink transmission, the UE automatically drops the sidelink transmission of the V2X communication of the first RAT system or the sidelink transmission of the V2X communication of the second RAT system, or the UE automatically adjusts sidelink power transmission of the V2X communication of the first RAT system or sidelink power transmission of the V2X communication of the second RAT, to meet that the adjusted total sidelink power transmission of the V2X communication of the first RAT system and the sidelink transmission of the V2X communication of the second RAT system in the overlapping area, which is less than or equal to the maximum transmit power of the UE.

3. If one of the two sidelink transmissions is transmission of a sidelink channel and the other one is reception of a sidelink channel, before a preparation time of performing the transmission of the sidelink transmission, according to a comparison result of a seventh indication value indicated by the priority field of the SCI of the sidelink transmission of the V2X communication of the first RAT system to an eighth indication value indicated by the priority field of the SCI of the sidelink transmission of the V2X communication of the second RAT system, the UE drops the sidelink transmission with the larger indication value.

4. If the seventh indication value is equal to the eighth indication value, or the seventh indication value and/or the eighth indication value is not obtained before a preparation time of performing the transmission of the sidelink transmission, the UE automatically drops the sidelink transmission of the V2X communication of the first RAT system or the sidelink transmission of the V2X communication of the second RAT system, or always drops the sidelink transmission of the V2X communication of the first RAT system or the sidelink transmission of the V2X communication of the second RAT system according to a pre-configured or pre-defined rule.

5. if one of the two sidelink transmissions is transmission of a sidelink channel and the other one is reception of a sidelink channel, the UE performs the sidelink transmission for the transmission and drops the sidelink transmission for the reception.

6. If the two sidelink transmissions are both receptions of sidelink channels, the UE automatically drops the sidelink transmission of the V2X communication of the first RAT system or the sidelink transmission of the V2X communication of the second RAT system.

For the UL transmission of the first RAT system, the sidelink transmission of the V2X communication of the first RAT system, and the sidelink transmission of the V2X communication of the second RAT system, handling solutions when the sidelink transmission (the sidelink transmission of the V2X communication of the first RAT system or the sidelink transmission of the V2X communication of the second RAT system) may temporally overlap with the UL transmission of the first RAT system, when the sidelink transmission of the V2X communication of the first RAT system temporally overlaps with the sidelink transmission of the V2X communication of the second RAT system, and when the sidelink transmission of the V2X communication of the first RAT system, the sidelink transmission of the V2X communication of the second RAT system, and the UL transmission of the first RAT system overlap with each other are described above.

When the sidelink transmission of the V2X communication of the first RAT system, the sidelink transmission of the V2X communication of the second RAT system, and the UL transmission of the first RAT system overlap with each other, the overlap between the two may be handled first, and then another overlap may be handled based on the previous handling result. For a solution of handling the overlap between two of the three overlaps, the above embodiment may be adopted, and normal transmission may be ensured.

In addition, in the above SCI, the priority parameter value (i.e., the above-mentioned indication value) in the SCI indicates priority of the corresponding transmission. When uplink transmission conflicts with a sidelink transmission at the terminal, it may be indicated by the priority parameter in the SCI. The smaller the priority parameter value in the SCI, the higher the priority, and the larger the priority parameter value, the lower the priority.

The first RAT system may be the NR system and the second RAT system may be the LTE system to further describe embodiments. In the description of the embodiments of the application, the UL transmission of the NR system may be referred to as NR UL, the V2X communication of the LTE system may be referred to as LTE V2X, and the V2X communication of the NR system may be referred to as NR V2X.

A case where the NR UL overlaps with the LTE V2X is described below.

In this embodiment, transmission of the NR UL of the UE may overlap with transmission or reception of the LTE V2X, and at this time, the behavior of the UE shall be specified.

Optionally, when transmission of the NR UL overlaps with reception of the LTE V2X, the UE shall transmit the NR UL and drop the reception of the LTE V2X. That is, the transmission of the NR UL always has a higher priority than the reception of the LTE V2X.

Optionally, when transmission of the NR UL overlaps with transmission of Mode 3 or Mode 4 of the LTE V2X operating in a same frequency band, if a priority of a data packet indicated in SCI of the sidelink transmission is higher than a pre-configured threshold, that is, if an indication value of the priority field is less than a value of a higher-level parameter (i.e., "thresSL-TxPrioritization"), the UE shall transmit Mode 3 or Mode 4 of the LTE V2X and drop the NR UL. Otherwise, if the indication value of the priority field is larger than or equal to the value of the higher-level parameter, the UE shall transmit the NR UL and drop sidelink transmission of Mode 3 or Mode 4 of the LTE V2X. That is, for the NR UL and the LTE V2X operating in the same frequency band, the UE may only transmit one of them, and decide which one to drop according to whether the priority of the data packet of the LTE V2X is greater than the pre-configured threshold. Optionally, when transmission of the NR UL overlaps with transmission of Mode 3 or Mode 4 of the LTE V2X operating in different frequency bands, if priority of a data packet indicated in SCI of the sidelink transmission is higher than a pre-configured threshold, that is, if an indication value of the priority field is less than the value of the higher-level parameter, the UE shall adjust transmission power of the NR UL to ensure that total transmission power in the overlapping area does not exceed the maximum transmission power $P_{CMAX}$ of the UE, and the specific adjustment method depends on the implementation of the UE. Otherwise, if the indication value of the priority field is greater than or equal to the value of the higher-level parameter, the UE shall adjust transmission power of Mode 3 or Mode 4 of the LTE V2X to ensure that the total transmission power in the overlapping area does not exceed the rated maximum transmission power $P_{CMAX}$ of the UE, and the specific adjustment method depends on the implementation of the UE. That is, the UE may decide whether to adjust the transmission power of Mode 3 or Mode 4 of the LTE V2X according to the priority of the data packet. For the NR UL and the LTE V2X operating in different frequency bands, the UE may transmit the NR UL and the LTE at the same time without exceeding $F_{CMAX}$, and determine which transmission power is to be adjusted according to whether the priority of the data packet of the LTE V2X is greater than the pre-configured threshold.

Determining to adjust the transmission power according to whether the priority of the data packet of the LTE V2X is greater than the pre-configured threshold so that the NR UL and the LTE are transmitted simultaneously without exceeding $P_{CMAX}$, may also be applied to the case where the NR UL with the LTE V2X operate in an overlapping frequency band.

Optionally, the above method of dropping or adjusting the transmission power according to whether the priority of the data packet of the LTE V2X is greater than the pre-configured threshold is only applied to the case where the UE is able to obtain the priority of the data packet of the LTE V2X before a preparation time of the transmission. If the UE cannot obtain the priority of the data packet of the LTE V2X before the preparation time of the transmission, which to drop or which transmission power to adjust depends on the implementation of the UE.

A case where the NR UL overlaps with the NR V2X is described below.

According to an embodiment, the UE has both an NR UU module and an NR V2X module. Accordingly, the above-mentioned handling of NR UL overlapping with LTE V2X may also be applied to the case where the NR UL overlaps with the NR V2X.

Optionally, when transmission of the NR UL overlaps with reception of the NR V2X, the UE shall transmit the NR UL and drop the reception of the NR V2X. That is, the transmission of the NR UL always has the higher priority than the reception of the NR V2X.

Optionally, when transmission of the NR UL overlaps with transmission of the NR V2X operating in a same frequency band, if a priority of a data packet indicated in the corresponding SCI of the sidelink transmission is higher than a pre-configured threshold (if it is a physical sidelink feedback channel (PSFCH)) that the NR V2X transmits, the data packet priority of the corresponding PSSCH is used. That is, if an indication value of a priority field is less than the value of the higher-level parameter (i.e., "thresSL-TxPrioritization"), the UE shall transmit the NR V2X and drop the NR UL; otherwise, if the indication value of the "Priority" field is greater than or equal to the value of the higher-level parameter, the UE shall transmit the NR UL and drop the NR V2X. That is, for the NR UL and the NR V2X operating in the same frequency band, the UE may only transmit one of them, and decide which one to drop according to whether the priority of the data packet of the NR V2X is greater than the pre-configured threshold.

Optionally, when transmission of the NR UL overlaps with transmission of the NR V2X operating in different frequency bands, if a priority of a data packet indicated in the corresponding SCI of the sidelink transmission is higher than a pre-configured threshold (if it is a PSFCH that the NR V2X transmits), the priority of data packet of the corresponding PSSCH is used. That is, if an indication value of the priority field is less than the value of the higher-level parameter (i.e., "thresSL-TxPrioritization"), the UE shall adjust transmission power of the NR UL to ensure a total transmission power in the overlapping area does not exceed the rated maximum transmission power $P_{CMAX}$ of the UE, and the specific adjustment method depends on the implementation of the UE. Otherwise, if the indication value of the priority field is greater than or equal to the value of the higher-level parameter, the UE shall adjust transmit power of the NR V2X to ensure the total transmission power in the overlapping area does not exceed the maximum rated transmission power $P_{CMAX}$ of the UE, and the specific adjustment method depends on the implementation of the UE. That is, whether to adjust the transmission power of the NR V2X is determined by the UE according to the priority of the data packet. For the NR UL and the NR V2X operating in different frequency bands, the UE may transmit the NR UL and the NR V2X simultaneously without exceeding the $P_{CMAX}$, and decide a transmission power to be adjusted according to whether the priority of the data packet of the NR V2X is greater than the pre-configured threshold.

The above solution of determining a transmission power to be adjusted according to whether the priority of the data packet of the NR V2X is greater than the pre-configured threshold so that the NR UL and the NR V2X are transmitted simultaneously without exceeding the $P_{CMAX}$, may also be applied to the case where the frequency bands of the NR UL with the NR V2X overlap.

The above method of dropping the NR V2X or the NR UL, or adjusting transmission power of the NR V2X or the NR UL according to whether the priority of the data packet of the NR V2X is greater than the pre-configured threshold is only applied to the case where the UE is able to obtain the priority of the data packet of the NR V2X before the preparation time of transmission. If the UE cannot obtain the priority of the data packet of the NR V2X before the preparation time of transmission, dropping and power transmission of the NR V2X and NR UL depends on the implementation of the UE.

A case where the LTE V2X overlaps with the NR V2X is described below.

In one example, the UE has both an LTE V2X module and an NR V2X module. That is, the UE may support the coexistence of the LTE V2X and the NR V2X. Accordingly, transmission/reception of the LTE V2X may overlap with transmission/reception of the NR V2X.

Optionally, when the transmission of the NR V2X overlaps with the transmission of LTE V2X operating in a same frequency band, if the UE may know the priorities of the data packets of both before the preparation time of transmission, the UE shall compare the priorities of the data packets of both, drop sidelink transmissions with lower priority (indication value of the "Priority" field is larger), and prepare and transmit sidelink transmissions with higher priority (indication value of the "Priority" field is smaller). If the priorities of the data packets of both are the same, or the UE may not know the priorities of the data packets of both before the preparation time of transmission, which one the UE transmits depends on the implementation of the UE.

Optionally, when the transmission of the NR V2X overlaps with the transmission of the LTE V2X operating in different frequency bands, if the UE knows the priorities of the data packets before the preparation time of transmission, the UE shall compare the priorities of the data packets, and adjust transmission power of the sidelink transmission with a lower priority (i.e., adjust an indication value of the priority field to be larger) to ensure that the total transmission power in the overlapping area does not exceed the rated maximum transmit power $P_{CMAX}$ of the UE, and the specific adjustment method depends on the implementation of the UE. If the priorities of the data packets are the same, or if the UE does not know the priorities of the data packets before the preparation time of transmission, the UE adjusts the transmission power of one of the sidelink transmissions to ensure that the total transmit power in the overlapping area does not exceed the rated maximum transmit power $P_{CMAX}$ of the UE, and whether the NR V2X or the LTE V2X is adjusted and the specific adjustment method depends on the implementation of the UE.

Optionally, when the transmission of the NR V2X overlaps with the reception of the LTE V2X, or when the reception of the NR V2X overlaps with the transmission of the LTE V2X, if the UE knows the priorities of the data packets before the preparation time of transmission, the UE shall compare the priorities of the data packets, drop the sidelink transmission with the lower priority (i.e., adjust an indication value of the priority field to be larger), and transmit or receive the sidelink transmission with the higher priority (i.e., the sidelink transmission with the smaller priority field). If the priorities of the data packets of both is the same, or the UE does not know the priorities of the data packets of both before the preparation time of transmission, at least one of the following methods (1-5) may be used:
1. One of the sidelink transmissions is dropped, and which one is dropped depends on the implementation of the UE.
2. The transmission of the sidelink transmission has a higher priority than the reception. That is, the UE drops the reception of the sidelink transmission and performs the transmission of the sidelink transmission.
3. The LTE V2X has the higher priority. That is, the UE drops the transmission or reception of the NR V2X and performs the transmission or reception of the LTE V2X.
4. The NR V2X has the higher priority. That is, the UE drops the transmission or reception of the LTE V2X, and performs the transmission or reception of the NR V2X.
5. When the transmission of the LTE V2X collides with the reception of the NR V2X, the transmission of LTE V2X has the higher priority. That is, the UE drops the reception of the NR V2X and performs the transmission of the LTE V2X. When the reception of the LTE V2X collides with the transmission of the NR V2X, one of the sidelink transmissions is dropped, and which one is dropped depends on the implementation of the UE.

Optionally, when the reception of the NR V2X overlaps with the reception of the LTE V2X operating in the same frequency band, the UE shall drop one of the sidelink transmissions, and which one is dropped depends on the implementation of the UE.

A case where the NR UL, the LTE V2X, and the NR V2X overlap is described below.

In an optional embodiment, in addition to supporting control of the LTE V2X by the NR UU, the UE may support the coexistence of the LTE V2X and the NR V2X. That is, the UE includes a NR UU module, a NR V2X module, and a LTE V2X module. Then transmission of the NR UL, transmission/reception of the LTE V2X and transmission/reception of the NR V2X may overlap.

Optionally, when the transmission of the NR UL simultaneously overlaps with the reception/transmission of the NR V2X and the reception/transmission of the LTE V2X operates in the same frequency band, the UE shall first handle the overlap between the sidelinks, and then handle the overlap between the sidelink and the NR UL by first handling the overlap between the reception/transmission of the NR V2X and the reception/transmission of the LTE V2X, and then handling the overlap between the reception/transmission of the NR V2X (or the LTE V2X) and the transmission of the NR UL. The overlap handling may use the method proposed in the foregoing embodiment of the application when two types of transmissions overlap.

Optionally, when the transmission of the NR UL simultaneously overlaps with the reception/transmission of the NR V2X and the reception/transmission of the LTE V2X operates in the same frequency band, the UE shall first handle the overlap between the links on the NR RAT, and then handle the overlap between the NR RAT and the LTE RAT. That is, first handle the overlap between the transmission of the NR UL and the reception/transmission of the NR V2X, and then handle the overlap between the transmission of the NR UL or the reception/transmission of the NR V2X and the reception/transmission of the LTE V2X.

When the transmission of the NR UL simultaneously overlaps with the transmission of the NR V2X and the reception of the LTE V2X operating in a same frequency band, or when the transmission of the NR UL simultaneously overlaps with the reception of the NR V2X and the transmission of the LTE V2X operating in a same frequency band, the UE shall first handle the overlap between the transmission links, and then handle the overlap between the transmission link and the reception link. That is, when the transmission of the NR UL overlaps with the transmission of the NR V2X and the reception of the LTE V2X at the same time, the UE first processes the overlap between the transmission of the NR UL and the transmission of the NR V2X, and then processes the overlap between the transmission of the NR UL (or the NR V2X) and the reception of the LTE V2X. When the transmission of the NR UL overlaps with the reception of the NR V2X and the transmission of the LTE V2X at the same time, the UE first processes the overlap between the transmission of the NR UL and the transmission of the LTE V2X, and then processes the overlap between the transmission of the NR UL (or the LTE V2X) and the reception of the NR V2X.

Optionally, when the transmission of the NR UL simultaneously overlaps with the reception of the NR V2X and the reception of the LTE V2X operating in the same frequency band, the UE shall firstly handle the overlap between the reception links, and then handle the overlap between the transmission link and the reception link. That is, the UE shall first handle the overlap between the reception of the NR V2X and the reception of the LTE V2X, and then handle the overlap between the reception of the NR V2X (or the LTE V2X) and the transmission of the NR UL.

When the transmission of the NR UL simultaneously overlaps with the transmission of the NR V2X and the transmission of the LTE V2X operating in the same frequency band, the UE shall first compare the priorities of the corresponding data packets of the NR V2X and the LTE V2X, and then compare the higher priority (i.e., the higher priority corresponds to an indication value of the priority field being smaller) to a pre-configured threshold.

If the corresponding data packets of the LTE V2X and the NR V2X have different priorities, and the higher priority is higher than the pre-configured threshold, that is, the indication value of the priority field is less than the value of the higher-level parameter (i.e., "thresSL-TxPrioritization"), the UE performs the transmission of the sidelink transmission with the higher priority (i.e., the higher priority corresponds to an indication value of the priority field being smaller), and drops the transmission of the sidelink transmission with the lower priority (i.e., the lower priority corresponds to an indication value of the priority field being larger), and drops the transmission of the NR UL. If the corresponding data packets of the LTE V2X and the NR V2X have different priorities, and the higher priority is lower than the pre-configured threshold, that is, the indication value of the priority field is larger than or equal to the value of the higher-level parameter (i.e., "thresSL-TxPrioritization"), the UE performs the transmission of the NR UL, and drops the transmissions of the LTE V2X and the NR V2X.

If the corresponding data packets of the LTE V2X and the NR V2X have the same priority, and the priority is lower than the pre-configured threshold, that is, the indication value of the "Priority" field is larger than or equal to the value of the higher-level parameter (i.e., "thresSL-TxPrioritization"), the UE performs the transmission of the NR UL, and drops the transmissions of the LTE V2X and the NR V2X.

If the corresponding data packets of the LTE V2X and the NR V2X have the same priority, and the priority is higher than the pre-configured threshold, that is, the indication value of the priority field is less than the value of the higher-level parameter (i.e., "thresSL-TxPrioritization"), the UE drops the transmission of the NR UL, and performs one of the transmissions of the LTE V2X and the NR V2X, and which one is transmitted depends on the implementation of the UE.

Optionally, the LTE V2X is controlled by the NR UU, and the NR V2X and the LTE V2X may share a same "thresSL-TxPrioritization" configuration. That is, the value of "thresSL-TxPrioritization" configured by the NR base station may be applied to the NR V2X and the LTE V2X.

In an example, the LTE V2X is controlled by the NR UU, and the NR V2X and the LTE V2X use different "thresSL-TxPrioritization" configurations. That is, the NR base station configures corresponding "thresSL-TxPrioritization" values for the NR V2X and the LTE V2X, respectively.

Optionally, when the transmission of the NR UL simultaneously overlaps with the transmission of the NR V2X and the transmission of the LTE V2X operating in different frequency bands, the UE shall first compare the priorities of corresponding data packets of the NR V2X and the LTE V2X, and then compare the higher priority to the pre-configured threshold.

If the corresponding data packets of the LTE V2X and the NR V2X have different priorities, and the higher priority is lower than the pre-configured threshold, that is, the indication value of the priority field is greater than or equal to the value of the higher-level parameter (i.e., "thresSL-TxPrioritization"), the UE shall adjust transmission power of the sidelink with the lower priority. If the total transmit power in the overlapping area still exceeds the rated maximum transmission power $P_{CMAX}$ of the UE after the transmission power of the sidelink with the lower priority being adjusted, the UE drops the transmission of the sidelink with the lower priority. If the total transmission power in the overlapping area still exceeds the rated maximum transmission power $P_{CMAX}$ of the UE after the transmission of the sidelink with the lower priority being dropped, the UE shall adjust the transmission power of the sidelink with the higher priority to ensure that the total transmission power in the overlapping area does not exceed the rated maximum transmission power $P_{CMAX}$ of the UE.

If the corresponding data packets of the LTE V2X and the NR V2X have different priorities, and the higher priority is higher than the pre-configured threshold, that is, the indication value of the priority field is less than the value of the higher-level parameter (i.e., "thresSL-TxPrioritization"), the UE shall adjust transmission power of the sidelink with the lower priority. If the total transmission power in the overlapping area still exceeds the rated maximum transmit power $P_{CMAX}$ of the UE after the transmission power of the sidelink transmission with the lower priority being adjusted, the UE drops the transmission of the sidelink transmission with the lower priority. If the total transmission power in the overlapping area still exceeds the rated maximum transmission power $P_{CMAX}$ of the UE after the transmission of the sidelink with the lower priority being dropped, the UE shall adjust the transmission power of the UL to ensure that the total transmission power in the overlapping area does not exceed the rated maximum transmit power $P_{CMAX}$ of the UE.

If the corresponding data packets of the LTE V2X and the NR V2X have the same priority, and the priority is lower than the pre-configured threshold, that is, the indication value of the priority field is larger than or equal to the value of the higher-level parameter (i.e., "thresSL-TxPrioritization"), the UE shall adjust transmission power of the LTE V2X and/or the NR V2X to ensure that the total transmission power in the overlapping area does not exceed the rated maximum transmission power $P_{CMAX}$ of the UE.

If the corresponding data packets of the LTE V2X and the NR V2X have the same priority, and the priority is higher than the pre-configured threshold, that is, the indication value of the priority field is less than the value of the higher-level parameter (i.e., "thresSL-TxPrioritization"), the UE shall adjust transmission power of the NR UL. If the total transmission power in the overlapping area still exceeds the rated maximum transmission power $P_{CMAX}$ of the UE after the transmission power of the NR UL is adjusted, the UE drops the transmission of the NR UL. If the total transmission power in the overlapping area still exceeds the rated maximum transmission power $P_{CMAX}$ of the UE after the transmission of the NR UL is dropped, the UE adjusts the transmission power of the LTE V2X or the NR V2X to ensure that the total transmission power in the overlapping area does not exceed the rated maximum transmission power $F_{CMAX}$ of the UE.

The base station of the first RAT system may be used as the execution subject, and the V2X communication method is briefly described below.

It should be noted that the following description of the communication method is only a corresponding description from the perspective of the base station. The essence of the content of the description is the same as that described above when the UE is the execution subject. Only a brief description is provided for when the method is executed on the base station side. The description of the corresponding part in the foregoing description may be used to supply detailed content of when the method is executed on the base station side.

Taking the base station of the first RAT system as the execution subject, the base station of the first RAT system (hereinafter simply referred to as the base station) transmits configuration information of the V2X communication in the second RAT system to the UE through higher layer signaling, so that the UE performs a corresponding sidelink transmission according to the configuration information of the V2X communication in the second RAT system.

The UE has both a UU interface module of the first RAT system and a V2X communication module supporting the V2X communication function of the second RAT system. The V2X communication module communicates with the base station via the UU interface module.

The UE transmits the information related to the V2X communication of the second RAT system received from the base station to the V2X communication module via the UU interface module, and transmits the information, transmitted by the V2X communication module to the base station via the UU interface module. The V2X communication module performs a sidelink transmission related to the V2X communication of the second RAT system.

Optionally, the above-mentioned higher layer signaling may include UE_specific RRC signaling, and/or a pre-defined dedicated cell SIB.

The configuration information of the V2X communication in the second RAT system may refer to the foregoing description of the configuration information.

Optionally, the base station transmits DCI for indicating sidelink resource scheduling information of the V2X communication in the second RAT system to the UE, so that the UE performs the corresponding sidelink transmission according to the configuration information and the sidelink resource scheduling information of the V2X communication in the second RAT system.

Details about the DCI for indicating the sidelink resource scheduling information of the V2X communication in the second RAT system may refer to the corresponding description of the DCI, described above.

Optionally, the base station transmits the DCI for indicating the sidelink resource scheduling information of the V2X communication in the second RAT system to the UE, receives a resource scheduling request for the V2X communication in the second RAT system transmitted by the UE through at least one of RRC signaling, dedicated SR signaling, and dedicated BSR; and transmits the DCI for indicating the sidelink resource scheduling information of the V2X communication in the second RAT system to the UE according to the resource scheduling request.

Optionally, the method further includes receiving capability information for informing the UE's communication capability transmitted by the UE. The capability information includes information that the UE has the capability to support the information exchange between the UU interface module and the V2X communication module. On this basis, the capability information may further include information about processing time of the information exchange between the UU interface module and the V2X communication module.

Figure 5:
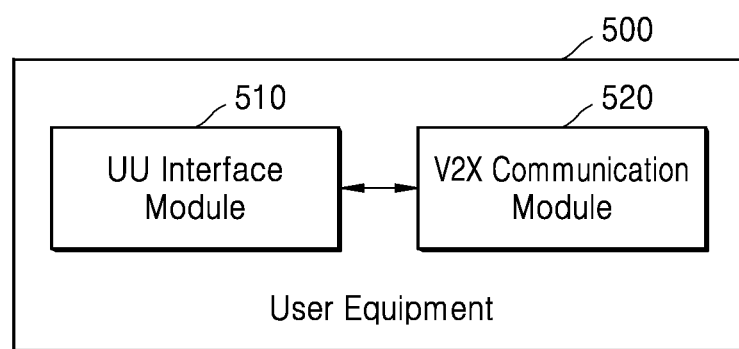
FIG. 5 shows a schematic structural diagram of a user equipment, according to an embodiment.

FIG. 5 shows a schematic structural diagram of a user equipment (i.e., a terminal) according to an embodiment.

As shown in FIG. 5, the user equipment 500 may include a UU interface module 510 configured to receive configuration information of V2X communication in a second RAT system transmitted by a base station of a first RAT system through high layer signaling; and a V2X communication module 520 configured to perform a corresponding sidelink transmission according to the configuration information of the V2X communication in the second RAT system.

Optionally, the UU interface module may be further configured to receive DCI for indicating sidelink resource scheduling information of the V2X communication in the second RAT system transmitted by the base station.

The V2X communication module may be specifically configured to perform the corresponding sidelink transmission according to the configuration information and the sidelink resource scheduling information of the V2X communication in the second RAT system.

Optionally, the UU interface module is specifically configured to transmit a resource scheduling request for the V2X communication in the second RAT system to the base station through at least one of RRC signaling, dedicated SR signaling, and dedicated BSR, and receive the DCI transmitted by the base station according to the resource scheduling request.

A base station is further provided in an embodiment of the application. The base station is a base station of a first RAT system, and the base station includes a UU interface module configured to transmit configuration information of V2X communication in a second RAT system to a UE through higher layer signaling so that the UE performs a corresponding sidelink transmission according to the configuration information of the V2X communication in the second RAT system.

Optionally, the UU interface module of the base station is further configured to transmit DCI for indicating sidelink resource scheduling information of the V2X communication in the second RAT system to the UE so that the UE may perform the corresponding sidelink transmission according to the configuration information and the sidelink resource scheduling information of the V2X communication in the second RAT system.

The UU interface module of the base station may be specifically configured to receive a resource scheduling request for the V2X communication in the second RAT system transmitted by the UE through at least one of RRC signaling, dedicated SR signaling, and dedicated BSR; and transmit DCI for indicating the sidelink resource scheduling information of the V2X communication in the second RAT system to the UE according to the resource scheduling request.

Since the user equipment and the base station provided in the embodiments of the disclosure are devices that may perform the methods in the embodiments of the disclosure, all devices used by those skilled in the art to implement the method in the embodiment of the disclosure fall within the protection scope of the application.

A communication system according to any of the embodiments of the application may be provided by a user equipment or a base station.

User equipment or a base station may include an electronic including a memory and a processor. The memory may store a computer program. The processor may be configured to call the computer program to perform the method provided in any of the embodiments of the application.

A computer-readable storage medium is provided in an embodiment of the application. The storage medium may store a computer program that, when executed by a processor, provides instructions to perform any of the embodiments of the present application.

As will be appreciated by those skilled in the art, the disclosure includes devices that may perform one or more of the operations in the application. These devices may be specially designed and manufactured for the required purpose or may include known devices in general-purpose computers. These devices have a computer program stored therein that are selectively activated or reconstructed. Such a computer program may be stored in a readable medium device (e.g., a computer) or in any type of medium suitable for storing electronic instructions and coupled to a bus, respectively. The computer readable medium may include, but is not limited to, any types of disks (including floppy disks, hard disks, compact discs, compact disc read only memories (CD-ROMs), magneto-optical discs, read-only memory (ROM), random access memory (RAM), erasable programmable read-only memory (EPROM), electrically EPROM (EEPROM), flash memory, a magnetic card or an optical card. That is, the readable medium may include any medium that stores or transfers information in a readable form by a device (e.g., a computer).

Those skilled in the art may understand that computer program instructions may be used to implement each block in FIGS. 1-6. Those skilled in the art may understand that these computer program instructions may be provided to a processor of a general-purpose computer, a professional computer, or other programmable data processing devices, so that the processor of the computer or other programmable data processing devices may execute the solutions specified in the block or blocks of the structural diagrams and/or block diagrams and/or flow diagrams disclosed by the disclosure.

Those skilled in the art may understand that steps, measures, and solutions in various operations, methods, and processes that have been discussed in the disclosure may be altered, modified, combined, or deleted. Further, other steps, measures, and solutions in various operations, methods, and processes that have been discussed in the disclosure may also be altered, modified, rearranged, decomposed, combined, or deleted. Further, solutions in the prior art that have steps, measures, and solutions in various operations, methods, and processes disclosed in the disclosure may also be altered, modified, rearranged, decomposed, combined, or deleted.

Figure 6:
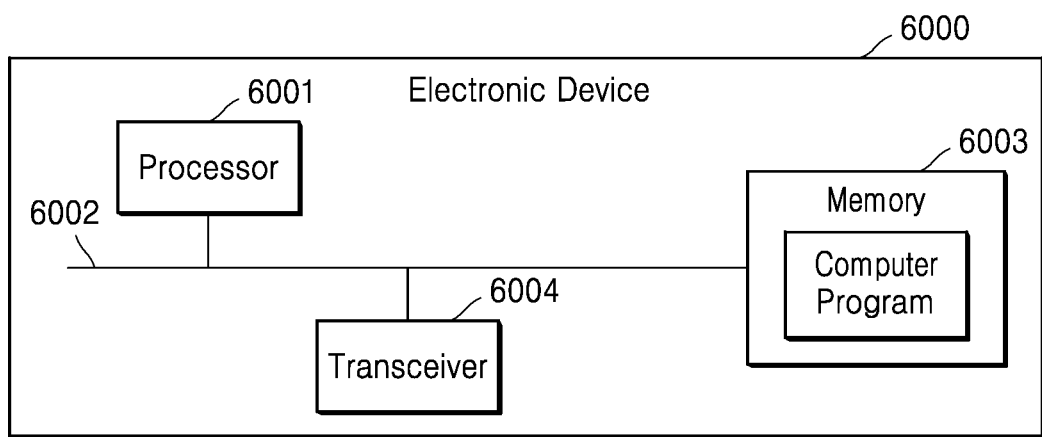
FIG. 6 shows a schematic structural diagram of an electronic device, according to an embodiment.

FIG. 6 shows a schematic structural diagram of an electronic device, according to an embodiment.

Referring to FIG. 6, the electronic device 6000 includes a processor 6001 and a memory 6003. The processor 6001 is connected to the memory 6003 through a bus 6002. The electronic device 6000 further includes a transceiver 6004. It should be noted that, in actual practical, the transceiver 6004 is not limited to one, and the structure of the electronic device 6000 does not limit the embodiments of the application.

The processor 6001 may be a central processing unit (CPU), a general-purpose processor, a digital signal processor (DSP), an application specific integrated circuit (ASIC), a field programmable gate array (FPGA), other programmable logic devices, transistor logic devices, hardware components or any combination thereof. Various exemplary logical blocks, modules, and circuits described in connection with the disclosure of the application may be implemented by the processor 6001. The processor 6001 may also be a combination that realizes computing functions, for example, a combination including one or more microprocessors, or a combination of DSP and microprocessor.

The bus 6002 may include a path for transmitting information between the above components. The bus 6002 may be a peripheral component interconnect (PCI) bus or an extended industry standard architecture (EISA). The bus 6002 may be divided into an address bus, a data bus, and a control bus.

The memory 6003 may be ROM or other types of static storage devices that may store static information and instructions; RAM or other types of dynamic storage devices that may store information and instructions; EEPROM; CD-ROM; other disk storages, such as compact discs, laser discs, optical discs, digital versatile discs, and blue-ray discs; or other magnetic storage devices. The memory 6003 may be any media which may be used to carry or store desired program code in the form of instructions or data structures and may be accessed by a computer.

The memory 6003 is configured to store application program code for performing the solutions of the application under the control of the processor 6001. The processor 6001 is configured to execute application program code stored in the memory 6003 to implement the embodiments.

It should be understood that, although steps in the flowcharts of the drawings are sequentially displayed in accordance with the directions of the arrows, these steps are not necessarily performed in the order indicated by the arrows. Unless explicitly stated herein, performing these steps is not strictly limited to a particular order, and they may be performed in other orders. Moreover, at least part of the steps in the flowcharts of the drawings may include a plurality of sub-steps or a plurality of stages. These sub-steps or stages are not necessarily performed at the same time, but may be performed at different times, and the orders thereof are not necessarily performed sequentially either, but may be performed in turn or alternately with other steps.

While the present disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. A method of operating a user equipment (UE) in a wireless communication system, the method comprising:
receiving, from a new radio (NR) base station, first downlink control information (DCI) for scheduling of a long term evolution (LTE) sidelink (SL); and
performing, based on the first DCI, a transmission of the LTE SL,
wherein the first DCI is scrambled by an LTE-SL-vehicle to everything (V2X)-radio network temporary identity (V-RNTI) different from an RNTI scrambling a second DCI, wherein the second DCI is for scheduling of an NR SL,
wherein the LTE-SL-V-RNTI is used to activate or deactivate a semi-persistently scheduled SL transmission, and
wherein at least one zero bit is added to the second DCI until a payload size of the second DCI equals a payload size of the first DCI based on a number of information bits of the second DCI being less than the payload size of the first DCI.

2. The method of claim 1, wherein the LTE SL is transmitted at least after an additional time offset from a reception of the first DCI, and
wherein the first DCI comprises information on the additional time offset.

3. The method of claim 1,
wherein a power for a uplink transmission is reduced to ensure that a total transmission power of the UE does not exceed $P_{CMAX}$ in case that the LTE SL overlaps an uplink transmission and an SL transmission has a higher priority than a pre-configured threshold.

4. The method of claim 1,
wherein a power for an SL transmission is reduced to ensure that the total transmission power of the UE does not exceed $P_{CMAX}$ in case that the SL transmission has a lower priority than a pre-configured threshold.

5. The method of claim 1,
wherein the performing of the transmission of the LTE SL further comprises:

in case that the transmission of the LTE SL overlaps a transmission of the NR SL in time, transmitting an SL with a higher priority between the LTE SL and NR SL.

6. The method of claim 5, wherein a priority of the LTE SL and a priority of the NR SL are known at least before the transmission of the LTE SL or the NR SL is performed.

7. A user equipment (UE) in a wireless communication system, the UE comprising:
- a transceiver; and
- at least one processor connected with the transceiver and configured to:
  - receive, from a new radio (NR) base station, first downlink control information (DCI) for scheduling of a long term evolution (LTE) sidelink (SL), and
  - perform, based on the first DCI, a transmission of the LTE SL,
- wherein the first DCI is scrambled by an LTE-SL-vehicle to everything (V2X)-radio network temporary identity (V-RNTI) different from an RNTI scrambling a second DCI, wherein the second DCI is for scheduling of an NR SL,
- wherein the LTE-SL-V-RNTI is used to activate or deactivate a semi-persistently scheduled SL transmission, and
- wherein at least one zero bit is added to the second DCI until a payload size of the second DCI equals a payload size of the first DCI based on a number of information bits of the second DCI being less than the payload size of the first DCI.

8. The UE of claim 7, wherein the LTE SL is transmitted at least after an additional time offset from a reception of the first DCI, and
- wherein the first DCI comprises information on the additional time offset.

9. The UE of claim 7,
- wherein a power for an uplink transmission is reduced to ensure that a total transmission power of the UE does not exceed $P_{CMAX}$ in case that the LTE SL overlaps an uplink transmission and an SL transmission has a higher priority than a pre-configured threshold.

10. The UE of claim 7,
- wherein a power for an SL transmission is reduced to ensure that the total transmission power of the UE does not exceed $P_{CMAX}$ in case that the SL transmission has a lower priority than a pre-configured threshold.

11. The UE of claim 7,
- wherein the at least one processor is further configured to:
  - in case that the transmission of the LTE SL overlaps a transmission of the NR SL in time, transmit an SL with a higher priority between the LTE SL and NR SL.

12. The UE of claim 11,
- wherein a priority of the LTE SL and a priority of the NR SL are known at least before the transmission of the LTE SL or the NR SL is performed.

13. A method of operating a new radio (NR) base station in a wireless communication system, the NR method comprising:
- transmitting first downlink control information (DCI) for scheduling of a long term evolution (LTE) sidelink (SL),
- wherein the first DCI is scrambled by an LTE-SL-vehicle to everything (V2X)-radio network temporary identity (V-RNTI) different from an RNTI scrambling a second DCI, wherein the second DCI is for scheduling of an NR SL,
- wherein the LTE-SL-V-RNTI is used to activate or deactivate a semi-persistently scheduled SL transmission, and
- wherein at least one zero bit is added to the second DCI until a payload size of the second DCI equals a payload size of the first DCI based on a number of information bits of the second DCI being less than the payload size of the first DCI.

14. A new radio (NR) base station in a wireless communication system, the base station comprising:
- a transceiver; and
- at least one processor connected with the transceiver and configured to:
  - transmit first downlink control information (DCI) for scheduling of a long term evolution (LTE) sidelink (SL),
- wherein the first DCI is scrambled by an LTE-SL-vehicle to everything (V2X)-radio network temporary identity (V-RNTI) different from an RNTI scrambling a second DCI, wherein the second DCI is for scheduling of an NR SL,
- wherein the LTE-SL-V-RNTI is used to activate or deactivate a semi-persistently scheduled SL transmission, and
- wherein at least one zero bit is added to the second DCI until a payload size of the second DCI equals a payload size of the first DCI based on a number of information bits of the second DCI being less than the payload size of the first DCI.

* * * * *